(12) United States Patent
Lovshin et al.

(10) Patent No.: US 10,985,643 B1
(45) Date of Patent: *Apr. 20, 2021

(54) SYSTEMS AND METHODS FOR COLLECTING, STORING, AND USING ELECTRICAL ENERGY FROM THE EARTH MAGNETIC FIELD

(71) Applicants: Albert James Lovshin, Butte, MT (US); Neal Rogers, Butte, MT (US)

(72) Inventors: Albert James Lovshin, Butte, MT (US); Neal Rogers, Butte, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,842

(22) Filed: Jun. 29, 2020

Related U.S. Application Data

(63) Continuation-in-part of application No. 16/179,797, filed on Nov. 2, 2018, which is a continuation-in-part of application No. 15/457,947, filed on Mar. 13, 2017, now Pat. No. 10,148,163, which is a continuation-in-part of application No. 14/802,987, filed on Jul. 17, 2015, now abandoned.

(60) Provisional application No. 62/070,211, filed on Aug. 19, 2014, provisional application No. 61/999,191, filed on Jul. 17, 2014.

(51) Int. Cl.
*H02K 99/00* (2014.01)
*G01V 3/08* (2006.01)

(52) U.S. Cl.
CPC ............. *H02K 99/10* (2016.11); *G01V 3/081* (2013.01)

(58) Field of Classification Search
CPC .............................. H02K 99/10; G01V 3/081
See application file for complete search history.

(56) References Cited

U.S. PATENT DOCUMENTS

| | | | |
|---|---|---|---|
| 4,153,757 | A | 5/1979 | Clark, III |
| 6,879,888 | B2 | 4/2005 | Ochiai |
| 7,468,562 | B1 | 12/2008 | Barbic |

(Continued)

OTHER PUBLICATIONS

Widodo et al., The Effect of NaCI Concentration on the Ionic NaCI Solutions Electrical Impedance Value using Electrochemical Impedance Spectroscopy Methods, 2018. Accessed Aug. 4, 2020. (Year: 2018).*

(Continued)

*Primary Examiner* — Sean Gugger
(74) *Attorney, Agent, or Firm* — CIONCA IP Law P.C.; Marin Cionca

(57) ABSTRACT

A system for using the Earth's magnetic field to provide supplemental power to a machine having a motor, the system comprising: a computer; a water wire; and an energy storing device; the computer being in electrical communication with the water wire and the energy storing device; the water wire comprising: a tube having a length and an inner diameter; a pair of conductive pins attached at each end of the tube; and a water solution having a conductive solute, the water solution being provided within the tube such that to contact the pair of conductive pins; wherein the water wire can collect electrical energy from the Earth's magnetic field when the machine is put in motion by a power source powering the motor; and wherein the collected electrical energy is stored in the energy storing device or used to provide the supplemental power to the machine or other machine components.

20 Claims, 13 Drawing Sheets

(56) References Cited

U.S. PATENT DOCUMENTS

| 8,098,040 | B1* | 1/2012 | Botto | B60L 8/006 |
|---|---|---|---|---|
| | | | | 320/101 |
| 2006/0163971 | A1 | 7/2006 | Gunderson | |
| 2011/0084503 | A1 | 4/2011 | Li | |
| 2012/0080888 | A1 | 4/2012 | Barbat | |
| 2012/0098272 | A1 | 4/2012 | Raghuprasad | |
| 2014/0285047 | A1* | 9/2014 | McCrady | B60L 50/90 |
| | | | | 310/154.01 |
| 2015/0280540 | A1 | 10/2015 | McCrady | |
| 2015/0311775 | A1 | 10/2015 | Singh | |
| 2015/0360571 | A1 | 12/2015 | McCrady | |
| 2016/0197543 | A1 | 7/2016 | Purvis | |

OTHER PUBLICATIONS

Brindley, Lewis. "Getting a look at water wires". 2009. Accessed Aug. 4, 2020 (Year: 2009).*

Zhao, et al., Iodine doped carbon nanotube cables exceeding specific electrical conductivity of metals, Scientific Reports, Sep. 6, 2011, 1-15.

"Can Carbon Nanotubes Replace Copper?", Sprovieri, John Assembly Magazine, Jan. 5, 2016, retrieved Aug. 3, 2017.

* cited by examiner

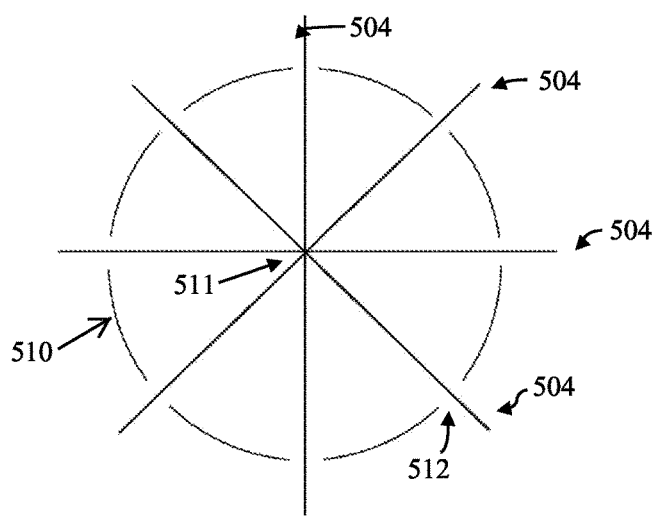
FIG. 5a
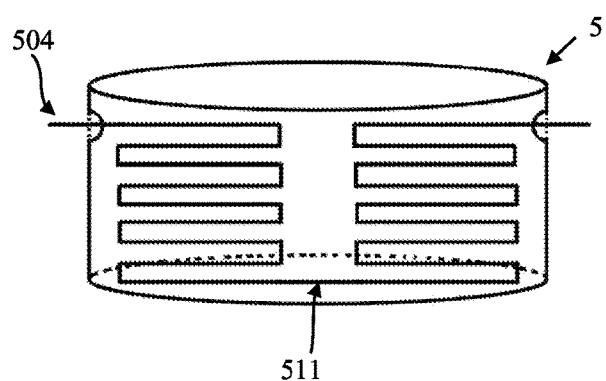 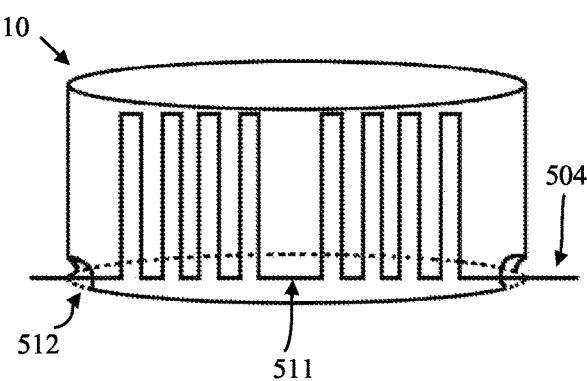
FIG. 5b          FIG. 5c

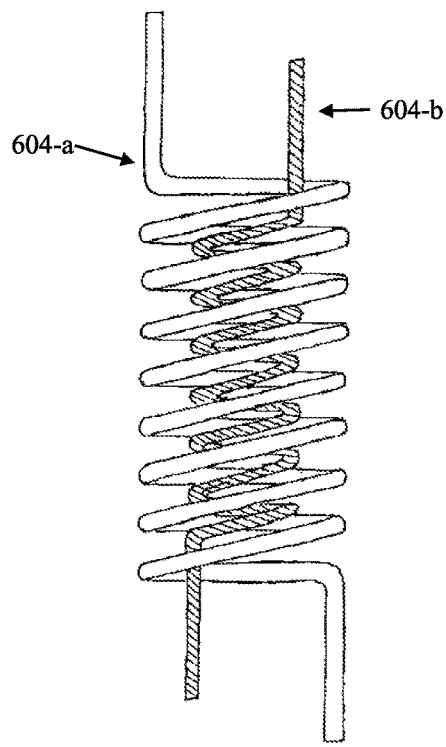
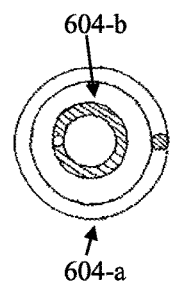
FIG. 6a  FIG. 6b
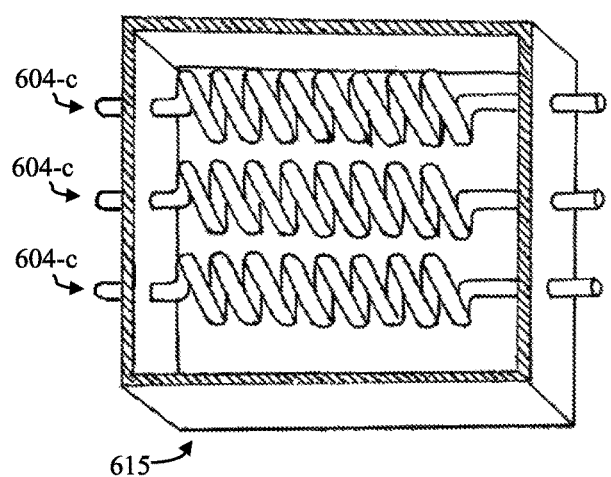
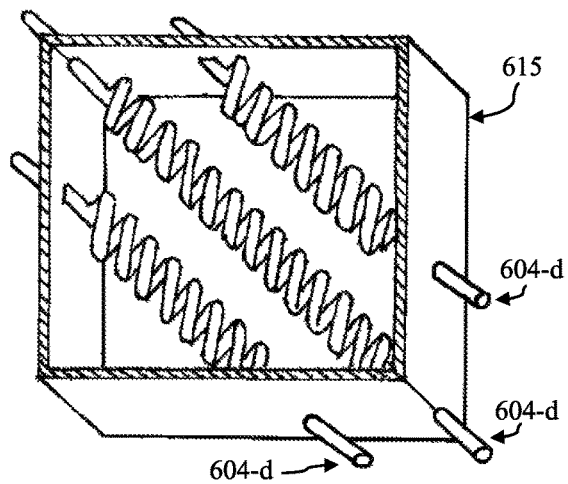
FIG. 6c  FIG. 6d

SYSTEMS AND METHODS FOR COLLECTING, STORING, AND USING ELECTRICAL ENERGY FROM THE EARTH MAGNETIC FIELD

CROSS-REFERENCE TO RELATED APPLICATIONS

This application is a continuation-in-part of and claims the benefit of U.S. Non-Provisional application Ser. No. 16/179,797, filed Nov. 2, 2018, which is a continuation-in-part of and claimed the benefit of U.S. Non-Provisional application Ser. No. 15/457,947, filed Mar. 13, 2017, which claimed the benefit of U.S. Non-Provisional application Ser. No. 14/802,987, filed Jul. 17, 2015, which claimed the benefit of U.S. Provisional Application No. 61/999,191, filed Jul. 17, 2014, and U.S. Provisional Application No. 62/070,211, filed Aug. 19, 2014, which are hereby incorporated by reference, to the extent that they are not conflicting with the present application.

BACKGROUND OF THE INVENTION

1. Field of the Invention

The invention relates generally to technologies based on the Earth magnetic field and more particularly to methods and systems for using the Earth's magnetic field as a source of energy for powering electric vehicles or other electrical devices.

2. Description of the Related Art

With growing demand for renewable energy, many consumers are choosing hybrid or electric vehicles. However, there are many obstacles to overcome for electric cars to become practical for widespread use. Many consumers are concerned with the range they are able to drive before requiring time-consuming charging, and much of today's infrastructure would have to be changed to alleviate this problem. Also, since the electricity is often generated initially through fossil fuels, electric vehicles are not using a truly renewable resource for power. There is still a need for a renewable resource to aid with powering vehicles and at least reduce the frequent and time-consuming charging.

It is known in the prior art that moving a conductive coil of wire through a magnetic field can produce an electrical current in the wire. The direction of the current through the wire is dependent on the relative direction of motion between the coil of wire and the magnetic field, and the voltage V generated by a wire of length l moving through a magnetic field B at velocity v is given by the equation:

$$V = B \times l \times v$$

As it will be described in detail hereinafter, this concept may be used in the generation of an electrical current for use to power or to supplement the power of an electrical motor, such as, for example, electrical motor(s) in an electrical or hybrid vehicle or other electrical devices, and thus address the need for a renewable resource.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one aspect, this invention may have as its objective the ability to generate electricity from the Earth's magnetic field while in motion to supply power to energy storing devices, such as supercapacitors, for example, as means for powering or at least supplementing the power of an electrical motor, such as, for example, electrical motor(s) in an electrical or hybrid vehicle or other electrical devices, and thus address the need for a renewable resource.

Using the principle described by the equation above, the voltage from the wire may be supplied into a plurality of energy storing devices, such as supercapacitors. As the vehicle travels, the wires may be moved through the Earth's magnetic field, and may charge the supercapacitors, which may discharge to a motor or other electrical device. The wire may be made from copper or any other conductive material.

In one exemplary embodiment, a system of wires arranged in any configuration deemed suitable supplying power to supercapacitors discharging to a motor in a vehicle is provided. The supercapacitors may be connected to both the wires which supply the electrical current generated by the Earth's magnetic field, and to the vehicle's motor through a computer interface bus. Thus, by providing a supplemental source of energy, an advantage is that the use of the system at minimum decreases the frequency of the need for the vehicle to be recharged or for the purchase of gasoline or electricity by the user. Another advantage is the overall decrease in the use of electricity generated by fossil fuels.

In another embodiment, a system is provided for retrofitting existing electric vehicles with wires to produce an electrical current from the Earth's magnetic field, that can at least supplement the other power sources of the vehicle, such as a battery or an internal combustion engine. A vehicle may also, for example, be constructed with the system built in.

In another aspect, a water wire is provided in the energy generation system, the water wire comprising: a tube made from magnetically transparent material like high-density polyethylene, the tube having a length, an inner diameter, and a thickness; a water solution having a conductive solute like dissolved sodium chloride provided within the tube, the conductive solute adjusting the resistance of the water solution; a pair of conductive pins, wherein each end of the tube is provided with a conductive pin of the pair of conductive pins, such that the pair of conductive pins contact the water solution; wherein, in the presence of a magnetic field, a voltage is generated, thus generating a power; and wherein the generated voltage is adapted to be transferred from the pair of conductive pins to supercapacitors discharging to a motor in a vehicle or other electrical device. Thus, an advantage is the ability to retrofit an electric vehicle or other machine with the water wire energy generation system while adding minimal additional weight to the vehicle. An additional advantage is the ability to adjust the resistance of the water solution by adjusting the conductive solute concentration, thus obtaining any amount of supplemental power desired. Another advantage is the ability to greatly adjust and adapt the energy generation system to work on a wide range of electrical machines by adjusting the water wire metrics, such as the wire thickness, diameter, and resistance. An additional advantage is that, in comparison with traditional copper wires, more energy from the Earth's magnetic field can be effectively extracted and transferred via the water wire, thus generating larger amounts of power.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 2b illustrates the connection of the voltmeter to the supercapacitor, by closing switches 2-S3 and 2-S4, as shown in FIG. 2a.

FIG. 3b illustrates the connection of the wattmeter, motor, and supercapacitor, by closing switches 3-S5 and 3-S6, as shown in FIG. 3a.

FIG. 5a illustrates the top view of an exemplary circular arrangement of wires.

FIGS. 5b-c illustrate the side views of two exemplary arrangements of FIG. 5a.

FIGS. 6a-d illustrate an exemplary nested coils arrangement of wires.

DETAILED DESCRIPTION OF THE PREFERRED EMBODIMENTS

Figure 1:
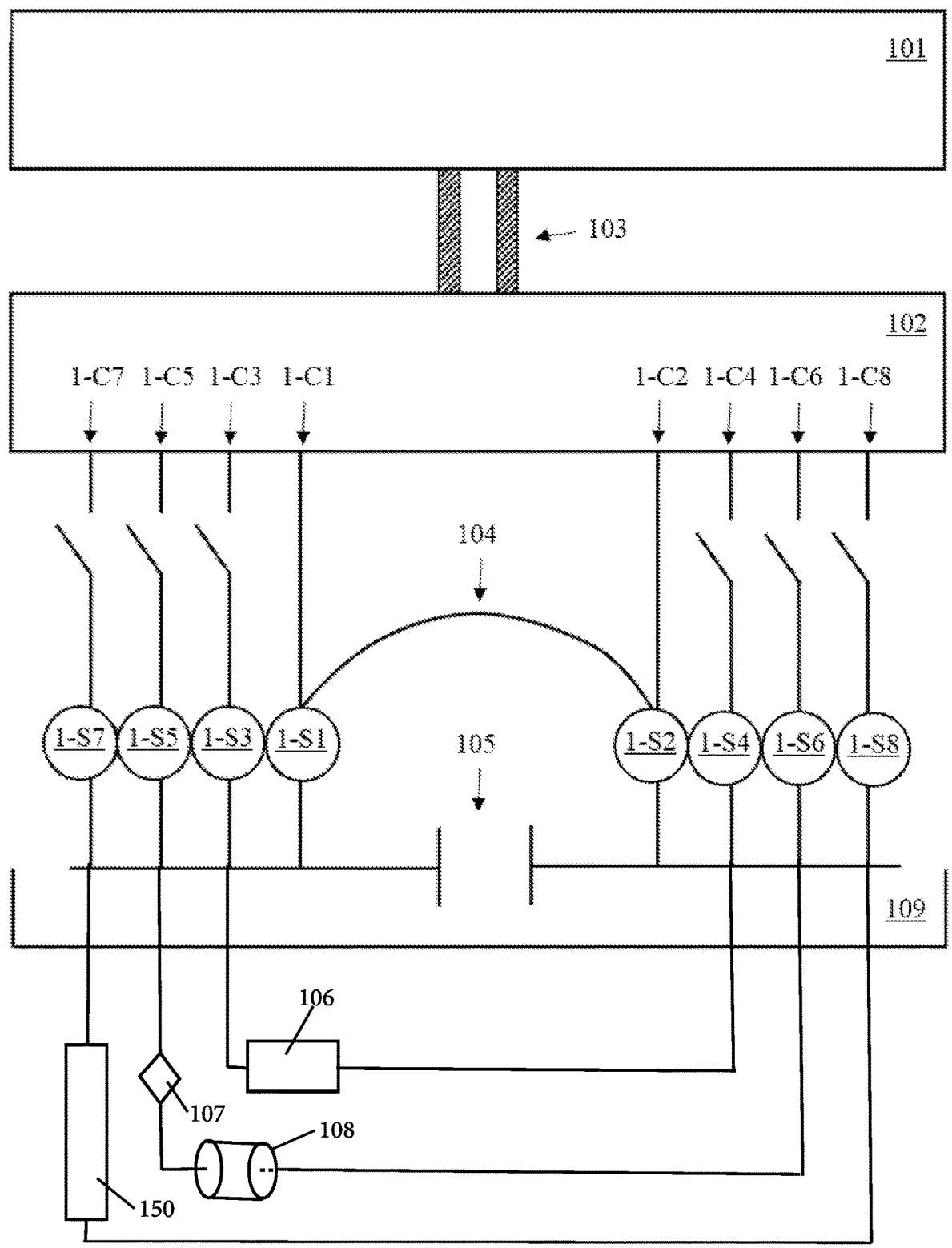
FIG. 1 illustrates an energy generation system controlled by a computer and comprising a wire, voltmeter, wattmeter, vehicle motor, supercapacitor, and computer interface bus, with switches configured to charge the supercapacitor, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

For the following description, it can be assumed that most correspondingly labeled elements across the figures (e.g., 104 and 204, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates an energy generation system controlled by a computer according to an exemplary embodiment, which may include as shown a wire 104, positive and negative connections 1-C1 and 1-C2 to a supercapacitor 105, positive and negative connections 1-C3 and 1-C4 to a voltmeter 106, positive and negative connections 1-C5 and 1-C6 to a wattmeter 107 and motor 108 (e.g., electric motor, linear induction motor, etc.), positive and negative connections 1-C7 and 1-C8 to a battery 150, all connected via a computer interface bus 102 and a bus bar 109. The bus bar 109 may be two separate wires, one wire that allows one side of computer controlled switches, S1, S3, S5, S7, connect to the positive side of supercapacitor 105, and another wire that allows one side of computer controlled switches S2, S4, S6, S8 connect to ground. Information from the computer interface bus 102 may be sent to a computer 101 by wires 103 or any other suitable means. The connections to the interface bus 102 can be made by closing switches 1-S1-1-S8, thereby connecting the circuits, and the opening and closing of the switches may be controlled by the computer 101. When switches 1-S1 and 1-S2 are closed as shown in FIG. 1, the wire 104 is connected to the supercapacitor 105. The wire 104 is then able to charge the supercapacitor 105 as it will be described hereinafter. According to an embodiment, as it will be described in detail hereinafter, at any given time, there may be at least one wire 104 in a suitable position relative to the lines of flux of the Earth's magnetic field in order to generate voltage. The generated voltage can be calculated using the following equation:

$$V = B \times l \times v$$

where V is the voltage generated in volts, B is the Earth's magnetic field, using $3 \times 10^{-5}$ Tesla (T) as an example, as the strength may vary, l is the length of the wire, and v is the velocity of the wire.

One or a plurality of energy modules depicted in FIG. 1 may be provided for any given application as necessary to for example supply the necessary energy amount for the respective application.

Figure 2A:
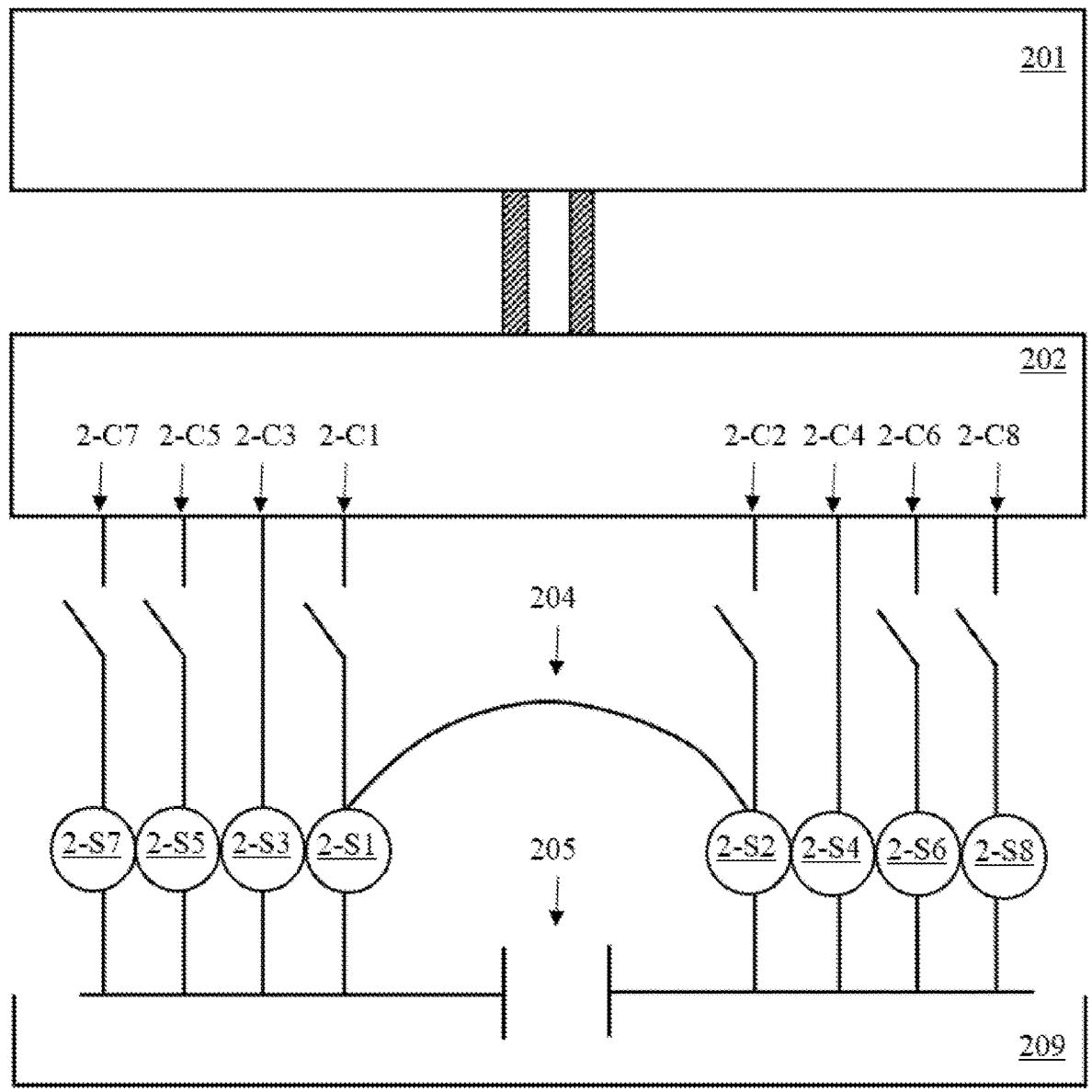
FIG. 2a illustrates the energy generation system of FIG. 1, with switches configured to connect the voltmeter across the supercapacitor.

Switches 1-S1 and 1-S2 may be opened certain times. As an example, switches 2-S1 and 2-S2 may be opened after 100 milliseconds (ms) of charging the supercapacitor 105, which disconnects the charging, and switches 2-S3 and 2-S4 may then be closed (see FIGS. 2a-b) to connect the voltmeter 106, 206 across the supercapacitor 105, 205, through the interface bus 102, 202. The voltage may then be read by the computer 101, 201, which then can use the information to calculate the energy stored in the supercapacitor 205 by the following equation:

$$E = \frac{CV^2}{2}$$

where E is the energy in joules (J), c is the capacitance in farads (F), and V is the voltage in the supercapacitor 205 in volts (V).

Figure 3A:
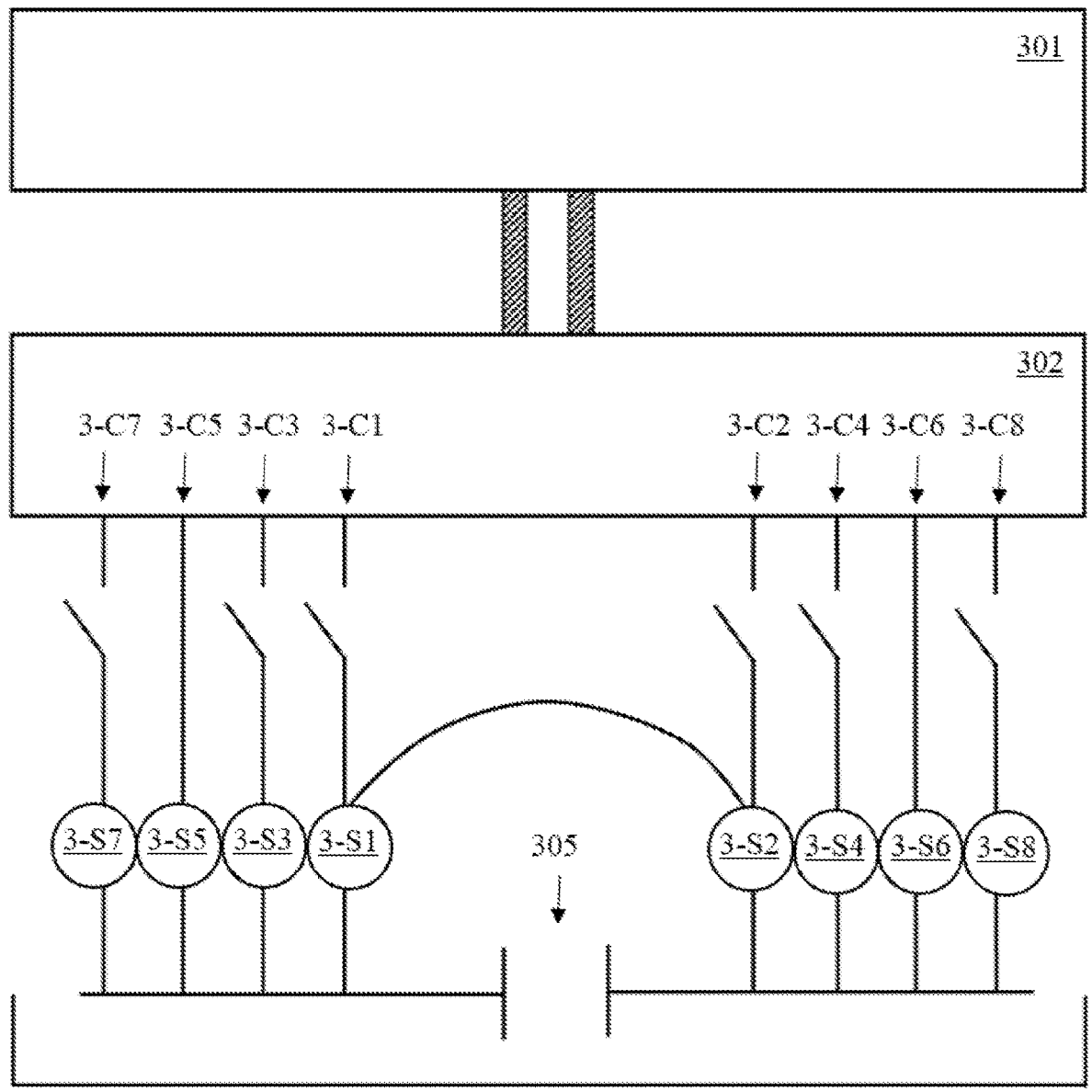
FIG. 3a illustrates the energy generation system of FIG. 1, with switches configured to connect the wattmeter across the motor.
Figure 3B:
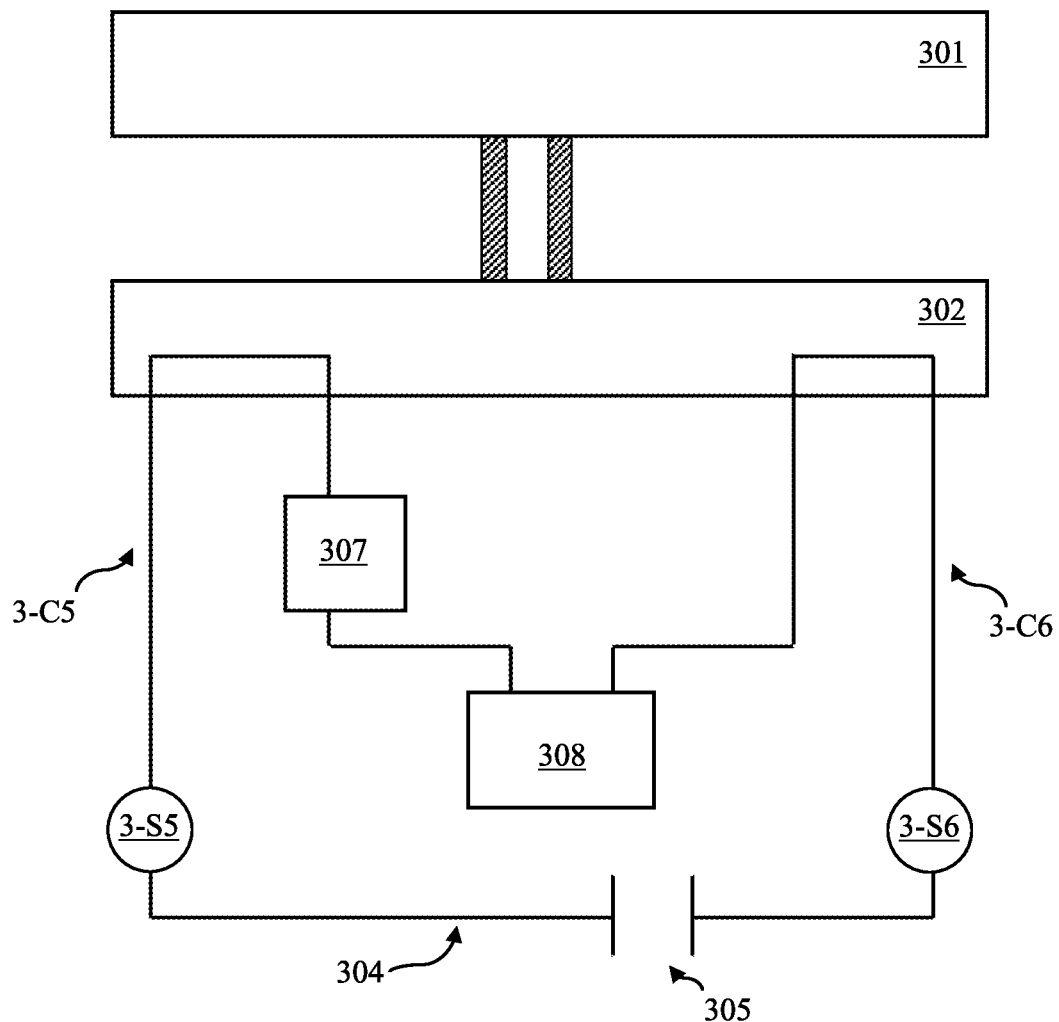

After some time (again, as an example, after 100 ms), switches S3 and S4 are then opened again and S1 and S2 are again closed (FIG. 1), such that the supercapacitor 105 can resume charging. When appropriate level of energy is detected in the supercapacitor 205, switches 3-S1 and 3-S2 may be opened and switches 3-S5 and 3-S6 may be closed (FIG. 3*a*), allowing the supercapacitor 305 to supply energy to the vehicle's motor 308 through circuits 3-C5 and 3-C6. As an example, such level of energy may be approximately 5,000 joules, which is when the voltmeter 106 reads approximately 0.99 volts (e=(c×v×v)/2 or e=(10000×0.99×0.99)/2=about 5000 joules).

An algorithm may be provided for the computer 101 to determine when to switch one supercapacitor 105 out for another, for example when only a small amount of energy is left in the supercapacitor 105 currently supplying power to the motor 108, 308. For example, when the energy in a first supercapacitor 105, 305 falls to the amount of energy needed for two more seconds of use, to power the motor, or to a predetermined minimum energy level (e.g., about 50 joules, which is when the voltmeter 106 reads about 0.1 volts; e=(c×v×v)/2 or e=(10000×0.1×0.1)/2=about 50 joules), a first set of switches associated with the first supercapacitor, namely 1-S5 and 1-S6 may be opened and 1-S1 and 1-S2 may be closed to resume charging. In the same time, a second charged supercapacitor 105, 305 may be connected to the motor 108, 308 by opening a second set of 1-S1 and 1-S2 switches, and closing a second set of 1-S5 and 1-S6 switches. Thus, according to this exemplary algorithm, the computer 101 can determine which and/or in what order the supercapacitors 105, 305 should be discharged to the motor 108, 308, battery 150 (when for example the motor 308 receives enough power from other super capacitors), and/or computer 101 itself, the time of discharge and which supercapacitors 105, 305 should be charged. Thus, it should be noted that a plurality of supercapacitors 105 may be used in the same energy module from FIG. 1 to be charged by wire(s) 104, so that for example continuous power is provided to the motor.

Figure 2B:
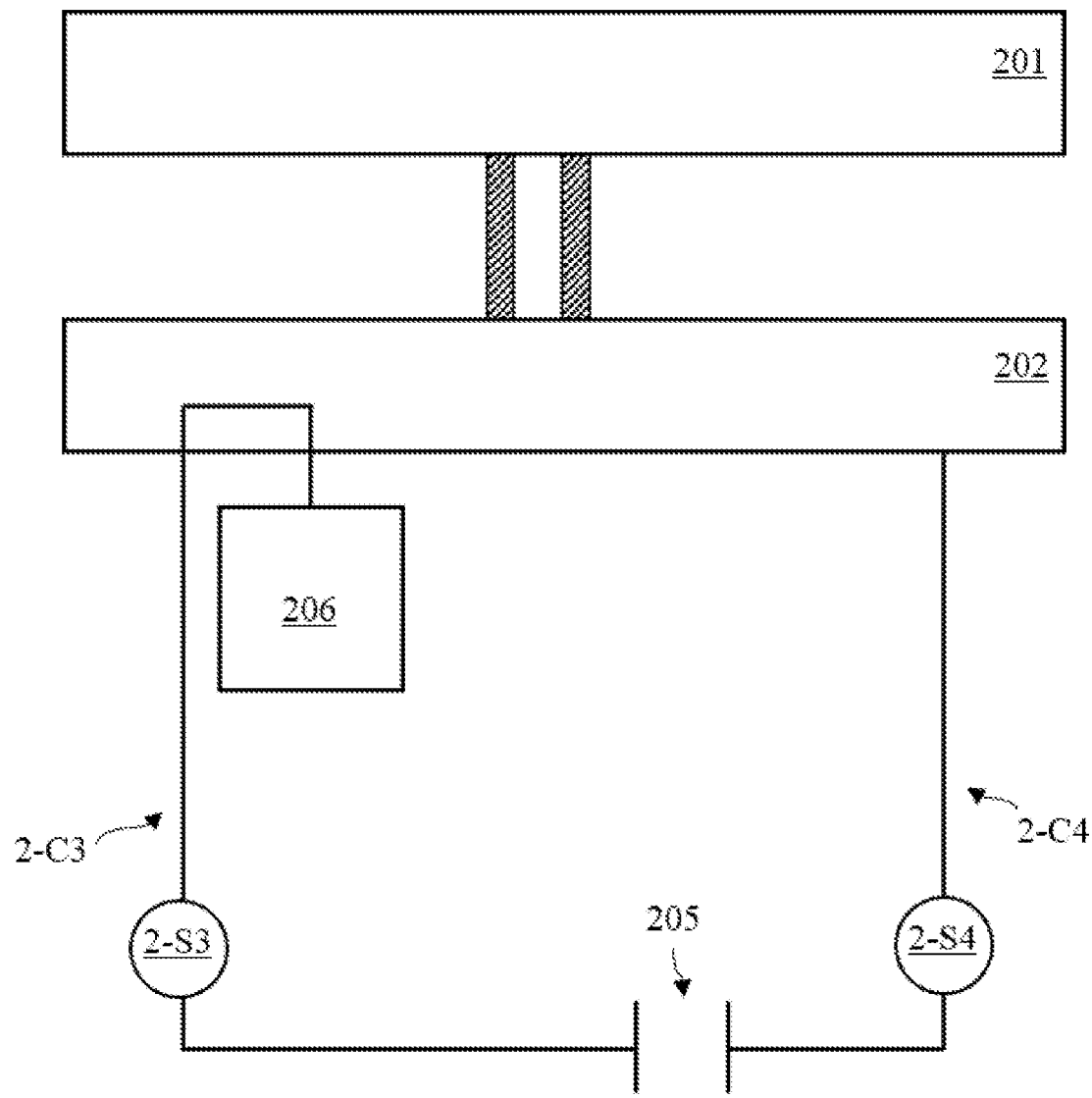
Figure 4:
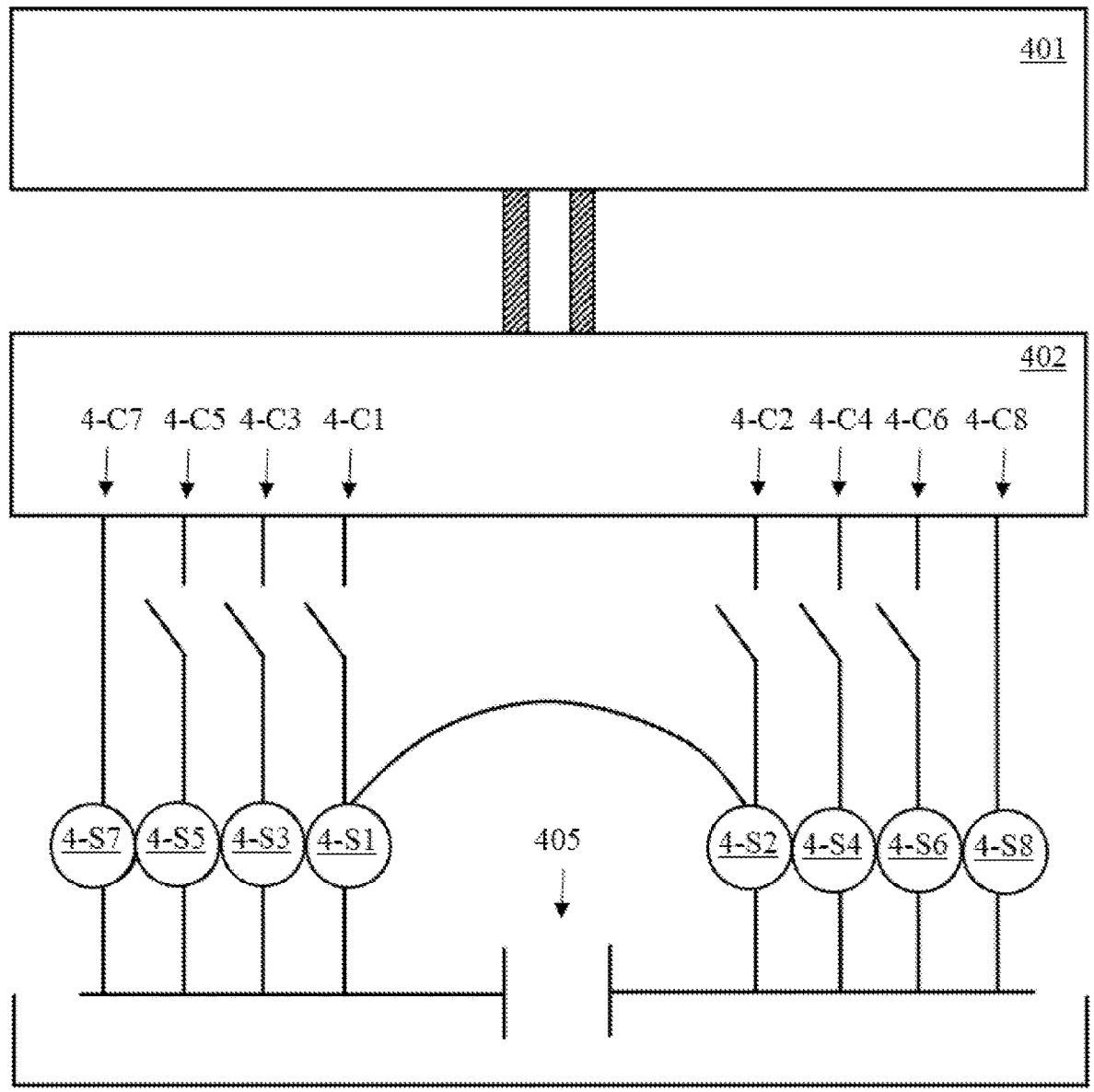
FIG. 4 illustrates the energy generation system of FIG. 1, with switches configured to charge a backup battery.

FIG. 4 illustrates the computer assembly of FIG. 1, with switches configured to charge or use the backup battery 150. Switches 4-S7 and 4-S8 may be closed when for example the vehicle is off, so that a battery connected by circuits 4-C7 and 4-C8 can be used to charge the supercapacitor 405 before starting the vehicle. If at any time the vehicle does not have enough power left in the supercapacitors 405, the back-up battery can be used to provide the missing power. As an example, a vehicle may be initially started by using power from the supercapacitors having stored energy, or may be started by using power from a back-up battery. The battery may be charged by either the supercapacitors 405 or an AC charger (not shown). For example, while the supercapacitor 105, 405 is charged by the battery 150, the computer 401 may check the voltage of the supercapacitor 405 by connecting the voltmeter as shown in FIG. 2*b*, and determine when the supercapacitor 405 is fully charged. The computer 101 may perform this by opening switches 4-S7 and 4-S8 and closing switches 4-S3 and 4-S4 for voltage readings at designated intervals of time (for example, 100 ms) until the supercapacitor 405 is fully charged. The computer 401 may continue this monitoring process while the vehicle is in motion, to determine how many joules of energy is needed by measuring the voltage and the current going to the motor 108, by monitoring the wattmeter 307. As an example, when the computer knows the velocity of the vehicle is 15.1 m/s, 1000 meters of wire is used, b=3.3 10 to minus 5, then voltage=0.5 volts. As an example, when a Chevy Volt™ travels 33.8 miles at 33.8 miles per hr, every 2.7 miles that the Chevy Volt™ travels it uses 1 kilowatt of energy. Thus, in 33.8 miles the Chevy Volt™ uses 12.5 kilowatts of energy. In this example, the computer 101 may need to make sure that the Chevy Volt™ has 12500 joules of every second at 15.1 m/s It should be noted that the computer 101 may include a processor (not shown), a memory (not shown) and the logic (software and/or hardware) necessary to implement the algorithms and processes described herein.

FIG. 5*a* illustrates the top view of an exemplary radial arrangement of a plurality of wires 504 (104 in FIG. 1) inside a cylinder 510. An advantage of the arrangement is that it allows there to be wires available at a suitable position relative to the lines of flux of the Earth's magnetic field at any given time. FIGS. 5*b-c* illustrate the side views of two exemplary arrangements of the wires 504 from FIG. 5*a* inside the cylinder 510. Only four wires 504, each bisecting the cylinder 510, are shown in FIG. 5*a* for clarity. However, a large plurality of wires 504, preferably as many as technically possible, may be placed inside of the cylinder 510, which (the cylinder) may be of any material that will not interfere with the Earth's magnetic field. Each of the wires 504 may extend out of the cylinder 510, without electrical contact with the cylinder 510 through holes 512 at both ends, and connect to the computer interface bus 109.

As shown in FIGS. 5*b-c*, where only a single wire is shown in each figure for clarity, the wires 504 may be folded such that a long length of wire can be fitted into a small space in a cylinder 510. For example, a 305 m. (meter) wire can be folded as shown in either FIG. 5*b* or FIG. 5*c* so that it measures 2 m. across the diameter of the cylinder 510. Each wire 504 should preferably be folded such that an unfolded wire loop 511 remains flat with no other folds on top of it, at the center of the cylinder 510. This would allow for other wires 504 of the same folded configuration to lay across the diameter of the cylinder 510, each crossing all other wires without electrical contact among them, at the wire loop 511, as shown in the top view in FIG. 5*a*.

As an example, a set of copper wires 504 of a standard 2 AWG gauge may be used in the arrangement illustrated in FIGS. 5*a-c* in order to generate electrical power by harvesting energy from the Earth' magnetic field. Energy at an exemplary rate of 40 J/s may be provided to the motor 108, as shown by the following equations and calculations.

A standard round 2 AWG wire has a diameter of 0.654 centimeters (cm). Calculations can be made for an exemplary cylinder with a height of 1 meter (m) and a diameter of 2 m (200 cm), with a slightly larger actual cylinder diameter used to accommodate the unfolded wire loop 511 and the space needed between the wires in the folds so that they do not have electrical contact. The number of times a 2 AWG wire could be folded vertically across that cylinder is 200 cm/0.654 cm=305.8, approximately 305 times. The height 1 m×305 folds gives a total length of 305 m of wire. Using the following equation $$V = B \times l \times v$$

B=3×10⁻⁵ T (an example within the range of the strength of the Earth's magnetic field at the Earth's surface), l=305 m, and v is an assumed velocity of the vehicle of 33.3 meters/second, so V=0.305 volts are obtained from one wire 504.

Since the wires 504 are copper, the resistivity p of the material is known, and calculated to be 0.5217 ohms (Ω) per 1000 m of 2 AWG copper wire using the equation $$R = \rho \cdot \frac{l}{A}$$

where R is the resistance in ohms, l is the length of the wire in m and A is the cross-sectional area of the wire in m². To calculate the resistance for the 305 m wire, (0.5217/1000)·305=0.159Ω. Using this resistance, the power can be calculated with the equation $$P = \frac{V^2}{R}$$

where V² is (0.305)²=0.093. Therefore 0.093/0.159=0.585 J/s is the rate at which power can be delivered from or to the supercapacitor 105 while charging, respectively, from a single wire.

The energy stored in a 10,000 F supercapacitor, which may be used as an example, is calculated with the equation $$E = \frac{CV^2}{2}$$

where V² is (0.305)²=0.093.0.093×10,000 farads/2=465 joules of energy in one supercapacitor.

A supercapacitor can supply a constant rate of power for a time t, in seconds (s), given by the equation $$t = [c \cdot (V_{charge}^2 - V_{min}^2)]/(2 \cdot p)$$

where $V_{charge}$ is 0.305 V as calculated above, and $V_{min}$ is a desired 0.1 V remaining in the supercapacitor for optimum performance, and p is the desired rate of power to the motor of 40 J/s. $V_{charge}^2$ is (0.305)²=0.093 and $V_{min}$ is (0.1)²=0.01. t is [10,000·(0.093−0.01)]/2~40=10.375 s of power by one wire. With 152 wires, 152·10.375=1577 s, or approximately 26.2 minutes. Alongside this, the time it takes to charge one supercapacitor is 465 joules/0.585=794.9 s, or approximately 13.2 minutes. With the rate of charge being approximately half of the time it takes to discharge all supercapacitors to 0.1 V, the vehicle may be provided with supplemental power of 40 J/s at this exemplary velocity. For any rate of power needed by the motor, using the equation above, the amount of time the supercapacitor can deliver power to the motor can be calculated. The computer 301 may be controlling the order in which the supercapacitors 305 will connect to the wire 304 to charge, then connect to the motor 308 to discharge and provide power, and reconnect to the wire to recharge, as described hereinbefore.

In another embodiment, a larger number of wires may be used, or a number of smaller sets of wires can be used to equal one larger plurality of wires. More wires may also be used in order to supply more power if needed, and more wires may also be used to supply power also to other parts of the vehicle, such as the lights, radio, or other components. In an embodiment, each wire 104, 504 may connect via the interface bus 109 to an individual supercapacitor 105.

FIGS. 6a-d illustrate an exemplary nested coils arrangement of wires with no electrical contact. FIG. 6a-b illustrate the side and top views of two coiled wires 604-a and 604-b, with wire 604-b nested inside of wire 604-a. Only two wires are shown for clarity, but more wires may be used. FIG. 6c shows three wire coils 604-c pointed in a direction parallel to the path of the vehicle, which preferably each have additional coiled wires nested inside as shown in FIGS. 6a-6b. FIG. 6d shows three wire coils 604-d pointed at an angle relative to wire coils 604-c. Only three sets of wire coils 604-c and 604-d are shown in each box 615 for clarity, though more or less may be used. Arranging the boxes with the wire coils 604-c and 604-d as shown in FIG. 6c-d allows there to be wires available at the correct position relative to the lines of flux of the Earth's magnetic field at any given time. As an example, wire coils 604-c in a box as shown in FIG. 6c may be positioned such that the wire coils 604-c are perpendicular to the ground, and may generate electricity as the vehicle travels in an east or west direction by cutting the lines of magnetic flux. As the vehicle changes direction to travel, north, south, north-east, north-west and so on, wire coils shown in FIG. 6d may be positioned at a horizontal angle with respect to the longitudinal axis of a car for example, preferably at a 45-degree angle, so that they continue to generate electricity by cutting the lines of the Earth's magnetic flux. So, in an embodiment, a set of wires may be placed at the 45-degree angle and other set at an opposite 45-degree angle relative to the longitudinal axis of the car (e.g., simulating the two rooftop diagonals), to ensure that irrespective of the direction of travel, at least one set of wires is cutting the lines of the Earth's magnetic flux and thus collect energy.

As an example, to achieve a rate of supplemental power supplied to the vehicle motor of 40 J/s, a system of nested coils may be used, as shown in FIG. 6a-6d. For example, three boxes 615 of four sets of nested wire coils, each set having four coils for a total of 48 coiled wires may be used for supplying electric current to 48 supercapacitors. Each wire (such as 604-a and 604-b shown in FIG. 6a-6b) for the purposes of this example may be a 0000 AWG copper wire having a wire diameter of 11.684 millimeters (mm). The resistivity of the material is known, and calculated to be 0.16072Ω per 1000 m using the equation $$R = p \cdot \frac{l}{A}$$

where l is the length of one coiled wire in m. To find the length, first a coil diameter of 1 m is used. The circumference of one such coil is 2πr=3.1416 m. In one meter length, a wire of 0000 AWG diameter width could fit approximately 85 times (1000 mm/11.684 mm=85.6). Therefore, it takes 3.1416×85=267 m of wire to make 85 coils in a 1 m length of space.

Since 1 V derived from a single wire is desired, a longer length of wire is needed for this example. When 1000 m of wire is used to make coils of the dimensions described above, approximately 1000/267=3.75 m length of space is required to accommodate the coil, and the equation $$V = B \times l \times v$$

can be used to find the amount of voltage generated from this wire. Using the same assumed variables as described above for the circular arrangement of wires, $(3\times10^{-5}T)\times(1000\text{ m})\times(33.3\text{ m/s})=1$ V for a single wire. Since 1 V is generated from 1000 m of wire, and the resistivity is $0.16072\Omega$ per 1000 m at this length, the power generated is $$P = \frac{V^2}{R}$$

$(1)^2/0.16072=6.22$ J/s. This is the rate at which power can be delivered from or to the supercapacitor while discharging or charging, respectively.

The amount of energy stored in a supercapacitor is found using the equation $$E = \frac{CV^2}{2}$$

where the supercapacitor has a capacitance of 10,000 farads. $[(10,000)\times(1)^2]/2=5,000$ J. The amount of time that a supercapacitor can provide a constant output of power is given by $$t=[c\cdot(V_{charge}^2-V_{min}^2)]/(2\cdot p)$$

where, again as was described above, $V_{min}$ is 0.1 volts left in the supercapacitor for optimum performance and $V_{charge}$ is 1. $[10,000\ (1-0.01)]/2.40=123.75$ s, or approximately 2.06 minutes, is therefore the duration of time that a supercapacitor can provide a constant output of power from one wire.

The second coil 604-b, also a 0000 AWG wire, inside of the first coil 604-a may preferably have a smaller diameter of coils in order to fit inside, as shown as an example in FIG. 6a-b. Four coils of similar length are therefore used as a set in this example, each coil nesting inside of another with the smallest diameter of coil as the innermost wire.

With a coil diameter of 0.92 m, the second wire 604-b can nest inside of the first wire 604-a and the circumference of one coil of the second wire 604-b is $(0.92\times\pi)=2.89$ m. Using the same equations outlined above, the same amount of power 6.22 J/s can be provided, for 123.75 seconds. With a set of four coils nested one inside of the other (see FIG. 6a), this amounts to 24.88 J for a duration of 495 s, or approximately 8.25 minutes of constant power output from one set. Approximately 20 J/s can be provided to the vehicle with this set, since $495/24.88=19.89$. Because preferably more sets of coils may be used, three sets of coils may be provided to achieve over the needed 40 joules of per second ($1485/18.66=79.6$ joules).

The time for recharge of one supercapacitor 305 using one wire coil set 604-c or 604-d is 5000 joules/24.88=200.96 seconds, or approximately 3.36 minutes. Since this is under the 8.25 minutes of constant power from another set, the vehicle may be provided with supplemental power at this exemplary velocity of 33.3 m/s, with the computer 301 controlling the order in which the supercapacitors 305 will connect to the wire 304 to charge, then connect to the motor 308 to discharge and provide power, and reconnect to the wire 304 to recharge.

In other exemplary embodiments, the copper wire from the energy module (e.g., FIG. 1) and/or wire arrangements (e.g., FIGS. 5a-c) described herein may be replaced by iodine doped carbon nanotubes cables, which is known to exceed the specific electrical conductivity of metals. Iodine doped carbon nanotubes cables have a resistivity of 10 to the minus 7 ohms per meter. They can carry 10 to the 4 to 10 to the 5 amps per one squared centimeter.

Again, it is known that $V=B\times l\times v$, where V is the voltage generated in volts, B is the Earth's magnetic field, using $3.3\times10^{-5}$ Tesla (T) as an example, as the strength may vary, l is the length of the carbon nanotubes cables, and v is the velocity of the wire (doped carbon nanotubes cables).

If for example the velocity=30.3 meters/sec and l=200 meters, the voltage $V=3.3\times10$ to minus $5\times200\times30.3=0.2$ volts.

The resistance in 200 meters of carbon nanotube cable is $200\times10$ to the minus 7. As known, the power=(voltage×voltage)/resistance ($P=V\times V/R$). Thus, the power that can be generated by 200 meters of carbon nanotube cable moving at 30.3 meters/sec within the Earth's magnetic field is $P=0.2$ volts×0.2 volts/(200 meters×10 to the minus 7 Ohms/meter)=$0.04/(2\times10$ to the minus 5)=2,000 (two thousand) joules/second or 2,000 watts.

At a voltage of 0.2 volts, knowing that resistance of iodine doped carbon nanotube cable is 10 to the minus 7 Ohms and that $l=V/R$, the current I is 0.2 volts/$2\times10$ to minus 7 Ohms, or 10,000 amps. This means that the doped carbon nanotube cable should have a cross-sectional area of 1 (one) square centimeter (10,000 amps/(10,000 amps/sq. cm)=1 sq. cm).

Volume of 200 Meters of Carbon Nanotube Cable

The volume of 200 meters of nanotube cable can be calculated as follows: 200 meters=$200\times100=20000$ cm; thus, the volume is 1 sq. cm×20000 cm=20,000 cubic cm.

Mass of 200 Meters of Carbon Nanotube Cable

It is known that the density of iodine doped carbon nanotubes cables is 0.33 g/cubic cm. Since density=mass/volume, the mass of 200 m of carbon nanotube cable is 0.33 g×20000 cubic cm=6600 grams or about 14.5 pounds (since 1 pound=454 grams).

As stated hereinabove, the amount of energy stored in a supercapacitor is found using the equation $$E = \frac{CV^2}{2}$$

When the supercapacitor has for example a capacitance of 10,000 farads, the energy (E) that can be stored in the supercapacitor by 200 m of carbon nanotube cable is $((0.2\times0.2)\times10000)/2=200$ joules.

In another example, if 500 meters of carbon nanotube cable is used instead of 200 meters, similar calculations as above, based on same assumptions, can be performed to derive the following:

Voltage=$3.3\times10$ to the minus $5\times500$ m×30.3 m/s=0.5 volts.

Resistance=500m×10 to the minus 7 ohms/m=$5\times10$ minus 5 ohms.

Current=0.5 volts/$5\times10$ to minus 5 Ohms=$1\times10$ to the power of 4 amps (A).

Area of cross-section of the carbon nanotube cable is 1 sq. cm (10,000 amps/(10,000 amps/sq. cm)=1 sq. cm).

Volume of 500 meter of the carbon nanotube cable is 50,000 cubic cm (volume=1 sq. cm×500×100=$5\times10$ to 4 cubic cm).

Since again, density=mass/volume, and density=0.33 g/cubic cm and volume=5×10 to 4 cubic cm, mass=0.33×5 10 to 4=16500 grams. Since 454 grams=1 pound, mass=16500/454=36.3 pounds=36 pounds.

In another example, if fifteen carbon nanotube cables, each 500 meters long are used, they will have a total weight of 15×36=548 pounds.

Each carbon nanotube cable of 500 meters in length will charge a supercapacitor to 1,250 joules (this can be derived from similar calculations shown above when referring to the 200-meter cable). Again, the computer 101 every millisecond for example monitors the charge on each supercapacitor 105, as described herein.

In an example, the 500 meter carbon nanotube cables may be coiled in "circles" of about 3 meters long (circumference). This means that when the carbon nanotube cable cross-section is about one square centimeter as described hereinbefore, the coil will be about 1.66 meters long. A 1.66 meters long coil could fit for example on the top of a car. When more than one is needed, the carbon nanotube cables may be fitted/nested inside of each other, as exemplary shown in FIGS. 5 and 6, and still, the length of the nested coils may be close to the 1.66 meters length.

In an example, 1000 meters long iodine doped carbon nanotube moving at a velocity=30.3 m/s may be used. Since, B=3.3×10 to minus 5 and voltage=B×L×V, voltage=1 (one) volt. The resistance of 1000 meter of iodine doped carbon nanotube is 1000×1×10 to minus 7=1×10 to minus 4. The power is (v×v)/r. Since v=1 volt and r=1×10 to minus 4 ohms, the power=1/1×10 to minus 4=10,000 watts=10,000 joules/s=10 kW. The energy stored in a capacitor=(v×v×c)/2. Since v=1 volt and c=10000 farads, e=5000 joules. Thus, it would take ½ (half) of second to charge the capacitor (5000 J/10000 J/s=½ s).

The velocity of 30.3 m/s is the equivalent of 67.7 miles/hr. As an example, when Chevy Volt™ travels 67.7 miles at 67.7 miles/hr, it travels one hour and every 2.7 miles that it travels uses 1 kilowatt·hour (kWh) of power. That means 25 (67.7/2.7) kilowatt of power is used for an hour (i.e., 25 kWh).

Since one 1000 m iodine doped carbon nanotube can produce 10 kW of power as described above, for example, 8 wires each of 1000 meters can be used at the same time (e.g., coiled and nested as described above), which could produce potentially up to 80 kW of power. The oversizing (80 kW>25 kW) may be used to account for example for the fact that not all wires may collect energy at full potential at the same time, depending on for example on the direction of travel of the carbon nanotube wires. However, as described herein, the 45-degree wire arrangement (especially when two 45-degree sets of wires are used (e.g., simulating the two cross diagonals of the rooftop of a car)) may ensure that at least one set (i.e., 4 wires or 40 kW) intersect the Earth's magnetic field irrespective of the direction of travel. Further, even if the power supplied by the wires would not be constantly sufficient to power a vehicle or a motor alone, it should be appreciated that even supplementing existing power sources (e.g., existing batteries) is a significant benefit.

Each wire may charge a super capacitor as shown in the chart below.

| | | | | | | | | | | |
|---|---|---|---|---|---|---|---|---|---|---|
| | | | | | supercapacitors | | | | | |
| | 200 | 400 | 600 | 800 | 1 sec | 1200 | 1400 | 1600 | 1800 | 2000 milliseconds |
| 1 | d | 200 | 400 | ch | ch | ch | ch | ch | | |
| 2 | ch | d | 200 | 400 | ch | ch | ch | ch | | |
| 3 | ch | | d | 200 | 400 | ch | ch | ch | | |
| 4 | ch | | | d | 200 | 400 | ch | ch | | |
| 5 | ch | | | | d | 200 | 400 | ch | | |
| 6 | ch | | | | | d | 200 | 400 | | |
| 7 | ch | | | | | | d | 200 | | |
| 8 | ch | | | | | | | d | | |

Again, at the stated speed, the Chevy Volt™ may discharge 5000 joules from a supercapacitor in 200 milliseconds (i.e., 25000 J/s) and it takes the supercapacitor 500 milliseconds (or half of second) to charge to 5000 joules.

In the chart above, "ch" means the supercapacitor is charged to 5000 joules; "d" means the supercapacitor is discharged; again, it takes 500 milliseconds to charge supercapacitor to 5000 joules. The chart is showing the times for charging and discharging the supercapacitors. For example, supercapacitor number 2, after being discharged at 400 milliseconds, it will be charged for 200 milliseconds at 600 milliseconds.

The volume of 1000 meter iodine doped nanotube in cubic cm is volume=1000×100 1 sq cm=1×10 to 5 cubic cm; since density=mass/volume and density=0.33 g/cubic cm, volume=1×10 to 5 cubic cm, mass=0.33×10 to 5 grams. Since, 454 grams=1 pound, mass in pounds is 0.33×10 to 5/454=73 pounds. 8 wires=73×8=584 pounds.

The current in 1000 meter wire is 10000 amps (I=v/r, v=1 volt, r=1000×1×10 to minus 7).

The above chart shows that 8 iodine doped carbon nanotubes cables of 1000 m each, may be enough to move or at least help move a Chevy Volt™ at 67.7 miles/hr.

In another example, 1000 meter iodine doped carbon nanotube cables may be used at a velocity=15.1 m/s=33.8 miles/hr. Since b=3.3×10 to minus 5, voltage=b×l×v, voltage=15.1×1000×3.3×10 to minus 5=0.5 volts. Since iodine doped carbon nanotubes have resistance of 1×10 to minus 7 ohms/meter, the resistance of 1000 meters is 1000×1×10 to minus 7=1×10 to minus 4 ohms; sine power=(v×v)/r, power=(0.5×0.5)/(1×10 to minus 4)=2.5×10 to minus 3=2500 watts=2500 joules/sec=2.5 kW; the energy (e) stored in a capacitor is e=(v×v×c)/2 or e=(0.5×0.5×10000)/2=1250 joules. If the Chevy Volt™ travels 33.8 miles at velocity of 33.8 m/hr, it travels for one hour and it uses 1 kilowatt hour (1 kWh) of energy for every 2.7 miles traveled; thus the number of kilowatts hour used for this travel is 33.8/2.7=12.5 kWh.

In an example, there are 8 wires (iodine doped carbon nanotube cables) each of 1000 meters may be used. Each wire may potentially produce as shown above (at 33.8 miles/hr) 2.5 kW. Thus, 8 wires could potentially produce a total of 20 kW. Again, the oversizing (20 kW>12.5 kW) may be used to account for example for the fact that not all wires may collect energy at full potential at the same time, depending on for example on the direction of travel of the carbon nanotube wires. However, as described herein, the 45-degree wire arrangement (especially when two 45-degree sets of wires are used (e.g., simulating the two cross diagonals of the rooftop of a car)) may ensure that at least one set (i.e., 4 wires or 10 kW) intersect the Earth's magnetic field irrespective of the direction of travel. Further, even if the power supplied by the wires would not be constantly sufficient to power a vehicle or a motor alone, it should be appreciated that even supplementing existing power sources (e.g., existing batteries) is a significant benefit.

Each wire charges a super capacitor to 1250 joules. The Chevy Volt™ discharges a super capacitor in 1250/12500=0.1 sec=100 milliseconds In the chart below, the top row is the time in 100 millisecond increments, the first column shows the super-capacitor number and the numbers inside the table are charging times in 100 milliseconds and implicitly the percentage of charge (i.e., 1=capacitor 20 percent charged, 2=capacitor 40 percent charged, 3=capacitor 60 percent charged, 4=capacitor 80 percent charged); d indicates that the capacitor is discharged; ch=indicates that the capacitor is charged.

1 2 3 4 5 6 7 8 9 10 11 12 13 14 15 16 17 18 19 20 time in 0.1 sec capacitors

| 1 | d  | 1  | 2  | 3  | 4  | ch | ch | d  | 1  | 2  | 3  | 4  | ch | ch |
|---|----|----|----|----|----|----|----|----|----|----|----|----|----|----|
| 2 | ch | d  | 1  | 2  | 3  | 4  | ch | ch | d  | 1  | 2  | 3  | 4  | ch |
| 3 | ch | ch | d  | 1  | 2  | 3  | 4  | ch | ch | d  | 1  | 2  | 3  | 4  |
| 4 | ch | ch | ch | d  | 1  | 2  | 3  | ch | ch | 1  | d  | 1  | 2  | 3  |
| 5 | ch | ch | ch | ch | d  | 1  | 2  | 3  | 4  | ch | ch | d  | 1  | 2  |
| 6 | ch | ch | ch | ch | ch | d  | 1  | 2  | 3  | 4  | ch | ch | d  | 1  |
| 7 | ch | ch | ch | ch | ch | ch | d  | 1  | 2  | 3  | 4  | ch | ch | d  |

As shown, at the end of 1 sec capacitor number one (c1) is discharged, capacitors 2 to 7 are charged; at the end of 0.2 sec capacitor c1 is 20 percent charged, capacitor 2 is discharged, capacitors 3 to 7 are charged; at the end of 0.3 sec capacitor 1 is 40 percent charged, capacitor 2 20 percent charged, capacitor 3 is discharged and capacitors 4 to 7 are charged; at the end of 0.4 sec capacitor 1 is 60 percent charged, capacitor 2 is 20 percent charged, capacitor 3 is 20 percent charged, capacitor 4 is discharged, and capacitors 5 to 7 charged, at the end of 0.5 sec. capacitor 1 is 80 percent charged, capacitor 2 is 60 percent charged, capacitor 3 is 40 percent charged, capacitor 4 is 20 percent charged, and capacitor 5 is discharged; at the end of 0.6 sec capacitor 1 is charged, capacitor 2 is 80 percent charged, capacitor 3 is 60 percent charged, capacitor 4 is 40 percent charged, capacitor 5 is 20 percent charged, capacitor 6 is discharged, and capacitor 7 is charged; at the end of 0.7 sec capacitor 1 is charged, capacitor 2 is charged, capacitor 3 is 80 percent charged, capacitor 4 is 60 percent charged, capacitor 5 is 40 percent charged, capacitor 6 is 20 percent charged and capacitor 7 is discharged Hence, as demonstrated above, as long as the Chevy Volt™ travels at 15.1 meters/sec=33.8 miles/hr, the 8, 1000 m iodine doped carbon nanotube wires may replace the battery as an energy source or at least supplement the battery.

Again, iodine doped carbon nanotube 1000 meters weighs 73 pounds; thus 7 wires each 1000 meters weigh 511 pounds.

In an example, the carbon nanotube cables may be fitted on the roof of a car preferably at a 45-degree horizontal angle with respect to the longitudinal axis of the car. In an example, this can be accomplished by placing the box with carbon nanotube cables shown in FIG. 6 flat on the top of the car, with the left side of the box facing the front of the car and the right side of the box facing the back of the car. This configuration may ensure that the carbon nanotube cables will intersect the Earth magnetic field irrespective of the direction of travel of the car, thus likely continuously collecting energy.

The carbon nanotube cables may be coated with an insulator (e.g., plastic) material that does not interfere with the Earth's magnetic field but prevents electrical contact between the carbon nanotube cables when for example they are coiled or nested together as described herein.

Figure 7A:
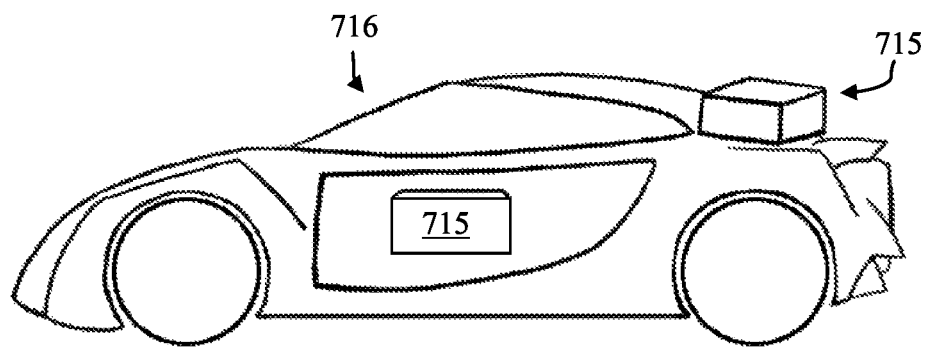
FIGS. 7a-b illustrate an example of retrofitting an electric vehicle with the nested coils system shown in FIGS. 6a-d.
Figure 7B:
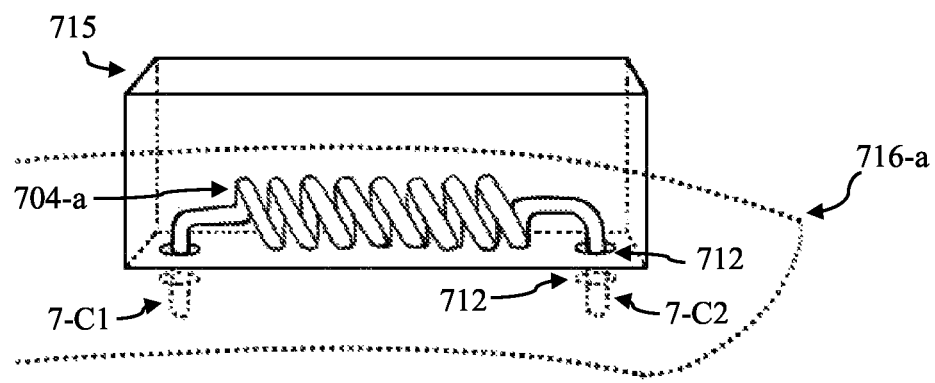

FIG. 7a illustrates a side view of an electric vehicle retrofitted with a system of nested coiled wires as in FIGS. 6a-d, according to an embodiment. An electric vehicle may be retrofitted with, for example, a circular arrangement of wires in a cylinder (FIGS. 5a-c), or a nested coiled wires arrangement in a box (FIGS. 6a-d) in order to provide power to the vehicle's motor. In one embodiment, a set of boxes 715 is placed in or on the vehicle (FIG. 7a). A plurality of coils, each preferably containing one or more coils nested inside, are placed in each box 715. FIG. 7b illustrates a wire 704-a which may be coiled and placed inside of a box 715 such that the box can be mounted anywhere on a vehicle. The wire 704-a may, for example, connect to a computer interface bus 102 via circuits 7-C1 and 7-C2. The computer interface bus 102 may be located in the interior of the vehicle, in which case the wire 704-a may reach the bus 102 by exiting the box 715 through holes 712 and 712-a of the box 715 and body of the vehicle 716-a, respectively.

Figure 7C:
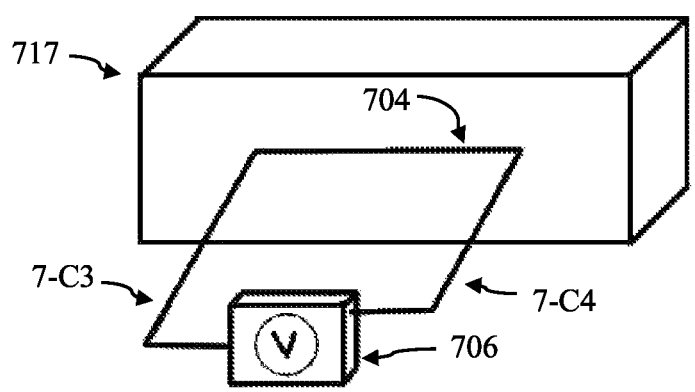
FIG. 7c shows an example of a wire connected to a voltmeter.

FIG. 7c shows an example of a wire 704 connected to a voltmeter 706. What follows is a succinct presentation of the experiments conducted to arrive at the systems and methods disclosed above. A vehicle was used to carry the wire 704 connected to a voltmeter 706 by circuits 7-C3 and 7-C4. The wire 704 and voltmeter 706 were attached to the vehicle by a wooden piece 717, which does not impede the Earth's magnetic field and provided insulation for the wire 704, protecting it from any interference from the vehicle. The experiment was performed on a small scale, driving the vehicle with only one wire 704 and taking readings from the voltmeter 706. The experiment showed that a voltage was collected by the wire 704. The collected voltage appeared to be sufficient to provide supplemental energy to an electric vehicle as disclosed above particularly if the number of wires were to be increased.

It should be understood that retrofitting a vehicle with the systems described herein and exemplarily shown in FIG. 7a-c may be performed in any manner deemed suitable, such as, for example, including a system attached via a trailer hitch to the vehicle, using a bicycle rack or other such similar devices to carry the system, or attaching the system onto the roof, doors, undercarriage, or interior of the vehicle using any suitable method. An electric vehicle may also be constructed with the system already built in, or the body of an electric vehicle may for example be constructed with other similar suitable technology such as, for example, integrated circuit technology, such that the body is made up of sheets of conductive material such as copper to allow the vehicle body to act as the copper wires. The sheets of copper may, for example, be etched in order for them to act as the wires as described in the system herein.

It should be understood that, the inventive aspects disclosed herein may be adapted for various applications, to supply or supplement power, for, for example, a space station, satellites, planes, drones, other aircraft, ships or missiles.

It should be further understood that the system disclosed herein may be able to use in a similar way, in addition to or as a replacement of the superconductor iodine doped carbon nanotubules, brand new superconductor materials such as metallic hydrogen, and other materials that are in development now and in the future.

Use of the system described herein for association with a space station or satellite may provide power or supplemental power to the space station or satellite. The power supplied may be similarly derived from the calculations described previously herein. In these examples, iodine doped carbon nanotubes may still be used, and a variable number of fibers ("fibers" or "wires") may be used. The iodine doped carbon nanotubes may have a resistance of 114 ohm, as is known in the art. The resistance when the number of iodine doped carbon nanotubes is increased is shown in the table below.

| Number of fibers | Resistance (ohms) |
|---|---|
| 1 | 114 |
| 2 | 57 |
| 4 | 28.5 |
| 8 | 14.25 |
| 16 | 7.12 |
| 32 | 3.56 |
| 64 | 1.78 |
| 128 | 0.89 |
| 256 | 0.44 |
| 512 | 0.22 |
| 1000 | 0.11 |
| 2000 | 0.055 |
| 4000 | 0.0275 |
| 8000 | 0.014 |
| 16000 | 0.007 |
| 32,000 | 0.0037 |
| 64,000 | 0.0015 |
| 128,000 | 0.00015 |
| 256,000 | 0.000406 |
| 512,000 | 0.000203 |
| 1,000,000 | 0.000101 |
| 2,000,000 | 0.0000567 |
| 4,000,000 | 0.000025 |
| 8,000,000 | 0.0000175 |
| 16,000,000 | 0.0000063 |
| 32,000,000 | 0.0000031 |
| 64,000,000 | 0.0000015 |
| 128,000,000 | 0.0000007 |
| 256,000,000 | 0.0000004 |
| 512,000,000 | 0.0000002 |
| 1,000,000,000 | 0.0000001 |

Here, the magnetic field at approximately 300 km above the earth may be calculated as being $3 \times 10'$ and a velocity of 8,000 m/second may be used for the velocity of a space station in orbit. Using the equation above to find the length of wire required, if voltage is 3 volts, then $3=(3 \times 10^{-8}) \times l \times (8,000)$, then $l=12,500$ m (or $1.25 \times 10^6$ cm) is calculated as the length of wire needed in total. As an example, each wire may be 200 m or 500 m in length. Next, c is given as $1 \times 10^6$ and again with the voltage given as 3 volts, e can be calculated as $(3 \times 3 \times 1 \times 10^6)/2=4.5 \times 10^6$ joules. The wires and the supercapacitors can thus provide power or supplemental power to the space station or satellite.

Other calculations used for this example may be carried out similarly to the example of using 1000-meter-long carbon nanotubes for the Chevy Volt™.

Again, as described herein, carbon nanotube cables may be coiled in "circles," which may have a radius of 3 meters as an example. Thus, the circumference of these circles can be calculated to be 18.85 meters. To show how many circles are needed to achieve the length calculated above, the following is calculated: $(12500)/(18.85)=675$.

The power is calculated by: $(3 \times 3)/(3 \times 10^{-4})=3 \times 10^4$ joules/second, according to the calculations and equations described herein. The time to charge a supercapacitor for one cable can be calculated by time=$(4.5 \times 10^6)/(3 \times 104)=1.5 \times 10^2$, or 1,500 seconds, or 1.5 hours. Because 24 hour/1.5 hour=16, one cable can charge 16 supercapacitors in one day. Each supercapacitor can hold as an example $4.5 \times 10^6$ joules. Ten cables can charge 160 supercapacitors. Every 1.5 hours, ten wires and supercapacitors may be capable of generating power or supplemental power, or sufficient power for a surplus, for the space station, which is known to be approximately $8 \times 104$ joules/sec to $12 \times 10^4$ joules/second. $12 \times 10^4$ joules/second may be accomplished by 4 cables, and thus, additional power may be generated by providing additional cables to the system. Similarly, power, or supplemental power, may be generated for a satellite.

As previously described throughout this disclosure above, the energy generation system shown in FIGS. 1-4 may adapted onto or within an electric vehicle (as in FIG. 7a) or some other machine, utilizing the Earth's magnetic field to induce an electric current to power the vehicle's motor. The energy generation system disclosed above is described herein as utilizing metal wire (e.g., 104 in FIG. 1), which may be copper, for example, or carbon nanotubes, to charge a large supercapacitor (e.g., 105 in FIG. 1). As described previously above, the metal wire may be at least a single wire, and when retrofitted onto an electric vehicle, the metal wire or carbon nanotubes may be provided as a plurality of wires arranged circularly in a cylinder (as in FIGS. 5a-5c) or arranged as nested coils in a rectangular box (as in FIGS. 6a-6d), as an example. As will be described throughout this disclosure below, the metal wire may alternatively be provided as a water wire to charge the supercapacitors and provide supplemental power to a machine having a motor. As will also be discussed throughout the disclosure below, as compared to using traditional metal wires or carbon nanotubes, the energy generation system may generate more power, while adding less overall additional weight, if configured with the water wire.

According to an aspect of the present invention, a water wire ("water wire," "electric water wire," "water tube") may be provided in the energy generation system of FIG. 1. As an example, the water wire may comprise a tube made of any highly magnetically transparent material. The tube may preferably be constructed of high-density polyethylene ("high-density polyethylene," "plexiglass") for its ability to withstand high heat and pressure levels. However, other materials may be used to construct the tubing, such as those materials used in space applications, like in the construction of satellite parts, for example. The particular tubing material may be selected and developed to satisfy the engineering needs of the chosen application (e.g., in construction of electric vehicles).

Figure 8:
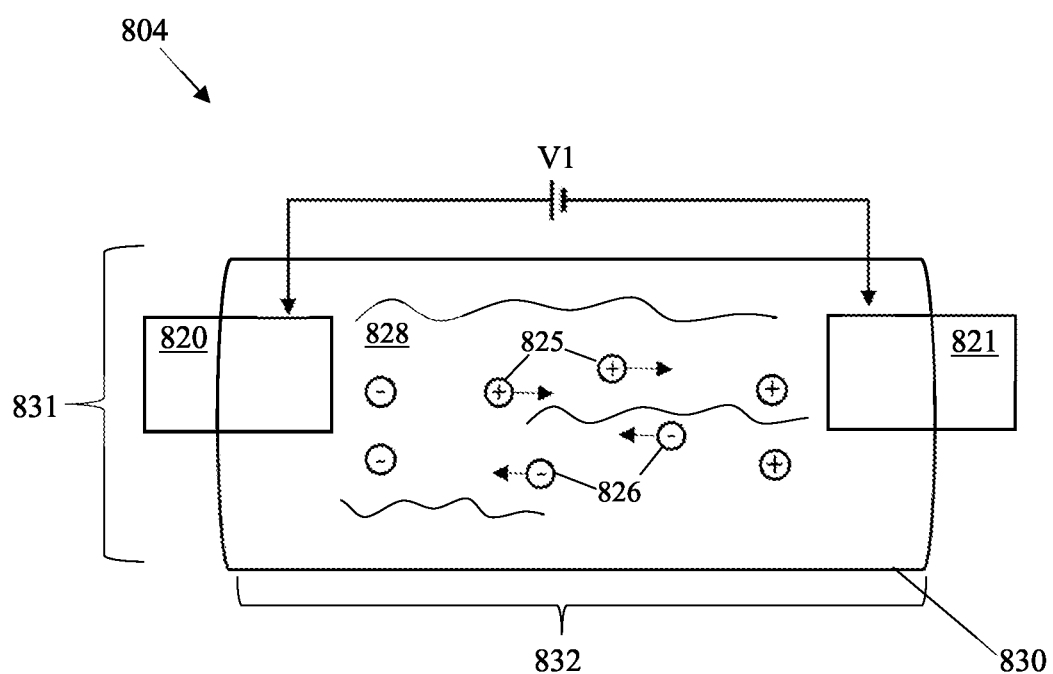
FIG. 8 is a representation of a water wire moving through the Earth's magnetic field lines of flux, according to an aspect.

FIG. 8 is a representation of a water wire moving through the Earth's magnetic field lines of flux, according to an aspect. As described above, the water wire 804 may be provided with an exterior tube ("tube," "tubing") 830, the tube having an inner diameter 831 and a length 832, as shown. It should be understood that the representation of the water wire shown in FIG. 8 is not drawn to scale and that only a portion of the tube is shown for clarity. The tube may also comprise a thickness (not shown), which will be described in greater detail later. As shown as an example in FIG. 8, the water wire 804 may also be provided a pair of electrical contact pins ("electrical contact pins," "contact pins," "conductive pins") 820, 821 (e.g., electrodes). As an example, the contact pin 820 may carry a positive charge (+) and the contact pin 821 may carry a negative charge (−) when current flows between the contact pins. It should be understood that the contact pins 820, 821 may be provided at opposite ends of the tube 830, and the particular positioning of the contact pins may be switched (i.e., 821 on the left end of the tube).

As previously mentioned above, moving a wire through a magnetic field may induce a current in the wire, thus generating a voltage. As shown in FIG. 8, voltage V1 may be generated between the conductive contact pins 820, 821, which may electrically connect to a supercapacitor, for example. Thus, an advantage is that the water wire connected to a supercapacitor are capable of generating enough electrical energy to power a vehicle's motor, as an example. As shown, the water wire may further comprise a solution 828 within the tubing 830, the solution 828 being a mixture of water and a conductive solute, as an example. The conductive solute may be, for example, dissolved sodium chloride, which consists of sodium and chlorine ions. It should be understood that other conductive solutes may be used to improve the conductivity of and adjust the resistance of the water solution, such as copper sulfate, sodium hydroxide, or silver and other halides, for example. In the example shown in FIG. 8, let the conductive solute be sodium chloride, with the contact pins 820, 821 placed at opposite ends of the tube 832 and submerged within the solution 828.

As is known in the art, when solid state sodium chloride is dissolved in water, the sodium chloride molecules break apart when reacting with the water molecules, allowing the individual sodium and chlorine ions to freely move around within the water solution. When the sodium and chlorine ions are introduced to a potential difference the ions become charge carriers and conduct electricity, by carrying electrons between the pair of contact pins, as an example. As is understood throughout this disclosure, the potential difference is introduced exclusively via the Earth's magnetic field lines of force, and not by a typical power source (e.g., a battery). As shown in FIG. 8, the positively charged sodium ions 825 move toward the conductive pin 821 and the negatively charged chlorine ions 826 move toward the conductive pin 820, such that electrons (not shown) are exchanged between the conductive pins. This movement of ions carrying electrons between the pair of conductive pins allows electric current to flow through the solution having a resistance, thus allowing the water wire 804 to generate voltage.

As previously mentioned above, the sodium ions 825 and the chlorine ions 826 conduct electricity when introduced to a potential difference, the potential difference being generated by the movement of the water wire through the Earth's magnetic field lines of force. In the water wire 804 shown in FIG. 8, the voltage V1 may thus be generated via the movement of the water wire 804 through the Earth's magnetic field. As the water wire 804 is moved through the Earth's magnetic field, the ions become more and more excited, increasing the current flow through the wire and therefore, the voltage between the conductive pins. As presented previously in this disclosure, the generated voltage V1 can be calculated using the following equation:

$$V = B \times l \times v$$

where V is the voltage generated in volts, B is the Earth's magnetic field, using $3 \times 10^{-5}$ Tesla (T) as an example, as the strength may vary, l is the length of the water wire, and v is the velocity of the water wire. As will be shown and discussed below, a relatively small amount of voltage (about 3 volts) needs to be generated by the water wire to charge a supercapacitor which may then efficiently power an electric vehicle's motor, or some other components of the vehicle.

As an example, let the water wire 804 be retrofitted onto an electric vehicle (e.g., a Chevy Volt™) and be provided in the exemplary system shown in FIG. 1 (for example in place of wire 104). Calculations can be made, which are to follow, to show that the water wire can be used to generate enough voltage to charge a large supercapacitor (series of supercapacitors), with the collected energy in the large supercapacitor being gradually released and distributed to power the Chevy Volt™. As shown in FIG. 1, the vehicle may be provided with a backup battery for power dependability purposes (e.g., initial startup of the vehicle). As the calculations will also show, the total weight added to the electric vehicle in adapting the water wire may be less than 100 pounds, which is less than the weight of adapting copper wires, for example.

Let the Chevy Volt™ travel at 30 meters per second (m/s) or 60 miles per hour (mph). If it is desired to generate V1=3 volts (V) using the water wire, the length of the water wire (tubing) needed can be calculated. Using the equation above, the length is calculated as follows:

$$V1 = B \times l \times v$$

$$3\,\text{V} = (3 \times 10^{-5}\,T)(l)\left(\frac{30\,\text{m}}{\text{s}}\right)$$

$$l = 3000\,\text{meters}$$

Simultaneously, knowing that approximately 50,000 watts (W) or 50,000 joules (J) per second are needed to power the electric vehicle, the needed resistance of the wire can be calculated using:

$$P = \frac{V^2}{R},$$

where P is the power in watts, V is the voltage in volts, and R is the resistance in Ohms. Solving for R, 50,000 W=$(3V)^2$/R, the resistance is found to be $1.8 \times 10^{-4}\,\Omega$. Now knowing this needed resistance, the resistance of the water can be adjusted. Pure water has a theoretical maximum resistivity ($\rho$) of about 18.2 M$\Omega$cm. The resistivity, and therefore the resistance, of the water solution may therefore be much lower, due to the presence of the dissolved sodium chloride. Thus, by doping the water with different suitable materials, the resistance can be adjusted to meet the target resistance of $1.8 \times 10^{-4}\,\Omega$, as an example. For example, the water can be doped with sodium hydroxide (instead of, or in addition to the sodium chloride) to adjust the water resistance. Now, having 3000 meters long of tubing and a water solution having $1.8 \times 10^{-4}\,\Omega$ of resistance, the tube can be filled with the water solution.

The 3000-meter-long tubing may have an inner diameter of 0.2 centimeters (cm). Knowing then that the inner radius of the tube would then be 0.1 cm, the volume of the tube can be found using:

Volume=Area×length

Volume=$\pi r^2 l$

Volume=$\pi (0.1\,\text{cm})^2 (300{,}000\,\text{cm})$=$9.42 \times 10^3\,\text{cm}^3$ The weight of water is approximately 1 gram (g) per cubic centimeter. Having calculated the volume of the water in the tube, the weight of the water is thus $9.42 \times 10^3$ g, or 9.42 kilograms (kg). The weight of the water in kilograms can be converted to pounds (lbs) by using the conversion 1 kg=2.20462 lbs. Thus, the weight of the water in pounds is $$\frac{9.42 \text{ kg}}{.45359 \text{ kg/lb}} = 20.7 \text{ lbs.}$$

The weight of the tubing itself may add a few additional pounds as well to the overall added weight to the electric vehicle.

As stated above, about 50,000 J/s of power is needed to operate the motor of the Chevy Volt™. The energy stored in a capacitor can be calculated using:

$$E_{cap} = \frac{c \times V1 \times V1}{2},$$

where c is the capacitance of the capacitor in Farads and V is the applied voltage in volts. Let the capacitance of the capacitor in this example be 1 million Farads (F) (i.e., multiple supercapacitors in parallel). Thus, the energy that can be stored in the capacitor is:

$$E_{cap} = \frac{(1 \times 10^6 F)(3 \text{ V})(3 \text{ V})}{2}$$

$$E_{cap} = 4.5 \times 10^6 \text{ J}$$

Now, the time it takes to charge the capacitor up to $4.5 \times 10^6$ J can be calculated, as shown below.

$$\text{Time}_{charge} = \frac{E_{cap}}{P_{Chevy\ Volt^{TM}}} = \frac{4.5 \times 10^6 \text{ J}}{50,000 \text{ J/s}} = 0.9 \times 10^2 \text{ s} = 90 \text{ s}$$

Following the same steps above, a 10 million Farad capacitor will hold about $4.5 \times 10^1$ J and will thus charge in about 900 s, or 15 minutes.

As shown through the above calculations, a single water wire connected to a large supercapacitor are capable of effectively running the Chevy Volt™. Clearly, through utilizing greater lengths of tubing, a larger number of non-magnetic flexible tubes, and/or lower resistance levels in the water solution, for example, the system described herein above can effectively generate larger amounts of power while adding minimal weight to the machine (electric car). As the tubing mounted on the electric vehicle is accelerated and steadily moved through the Earth's magnetic field at approximately 30 m/s, the sodium and chlorine ion charge carriers generate approximately 3V. The generated voltage is then transferred from the connected conductive pins in the water wire to the supercapacitor(s), which powers the vehicle's motor. It should be understood that the automatic switching operations and timing controls may follow the same methods described previously when referring to FIG. 1. As stated above, the water wire shown in FIG. 8 may be substituted and adapted into the existing energy generation system of FIG. 1 in place of the traditional metal wire (shown by 104). Switches 1-S1 and 1-S2 may be opened certain times.

Referring back to FIG. 1, as an example, switches 2-S1 and 2-S2 may be opened after 100 milliseconds (ms) of charging the supercapacitor 105, which disconnects the charging, and switches 2-S3 and 2-S4 may then be closed (see FIGS. 2a-b) to connect the voltmeter 106, 206 across the supercapacitor 105, 205, through the interface bus 102, 202. The voltage may then be read by the computer 101, 201, which then can use the information to calculate the energy stored in the supercapacitor 205 by the equation presented above ($E_{cap}$).

After some time (again, as an example, after 100 ms), switches S3 and S4 are then opened again and S1 and S2 are again closed (FIG. 1), such that the supercapacitor 105 can resume charging. When appropriate level of energy is detected in the supercapacitor 205 by the wattmeter 107, switches 3-S1 and 3-S2 may be opened and switches 3-S5 and 3-S6 may be closed (FIG. 3a), allowing the supercapacitor 305 to supply energy to the vehicle's motor 308 through circuits 3-C5 and 3-C6. It should be understood that supercapacitors should be used to continuously supply the supplemental power, originating from the water wire, to the machine.

It should also be understood that the water wire may be adapted into the energy generation system to power larger electric vehicles (e.g., trucks) by increasing the lengths, diameters, and/or number of the tubes. It should also be understood that the water wire may be adapted into energy generation systems for powering components in machines like satellites, drones, space stations, ships, airplanes, etc., essentially any platform moving through the Earth's magnetic field that needs supplemental power.

As an example, the magnetic field at approximately 300 km above the Earth may be calculated as being $3 \times 10^{-8}$ T and a velocity of 8,000 m/s may be used for the velocity of a space station or satellite in orbit. Using the equation above to find the length of water wire required, if voltage is 3V, then $3V = (3 \times 10^{-8} \text{ T}) \times l \times (8,000 \text{ m/s})$, then $l = 12,500$ m (or $1.25 \times 10^6$ cm) is calculated as the length of water wire tubing needed in total. As an example, a single 12,500 m tube may be used, or several 200 m or 500 m tubes arranged in parallel. Next, capacitance may be given as $1 \times 10^6$ Farads and again with the voltage given as 3 volts, the energy stored in the capacitor can be calculated as $(3V \times 3V \times 1 \times 10^6 F)/2 = 4.5 \times 106$ Joules. The water wires and the supercapacitors can thus provide power or supplemental power to the space station or satellite.

Thus, an advantage is the ability to retrofit an electric vehicle with the water wire energy generation system while adding minimal additional weight to the vehicle. Another advantage is the ability to greatly adjust and adapt the energy generation system to work on a wide range of electrical devices by adjusting the water wire metrics, such as the wire thickness, diameter, and resistance. An additional advantage is that, in comparison with traditional copper wires, more energy from the Earth's magnetic field can be effectively extracted and transferred via the water wire, thus generating larger amounts of power.

While the water wire has been shown to be capable of generating enough voltage to charge a supercapacitor and thus power an electric vehicle through the calculations above, there are other factors that must be taken into consideration when implementing the disclosed water wire. Naturally, during the collection of magnetic energy and the transformation of the energy into electrical energy, heat may be produced within the wire. Additionally, in Northern climates, particularly where temperatures can get extremely cold, the water wires may be susceptible to freezing and/or expansion of the water molecules when the vehicle is parked.

In order to address the issues presented above, the water wire can be specifically adapted to the type of environment the water wire will be subject to. As an example, in cooler climates, where freezing of the water solution could be an issue, the material used to construct the tubing of the water wire may be selected to have anti-freezing characteristics. The material may be chosen to be partially like that of rubber, for example, to prevent the tube itself from freezing. Additionally, an external plugin (or a small internal combustion engine) could be provided to minimally heat up the tube, such that the water solution within the tube is prevented from freezing. Retrofitting the water wire within a well-insulated casing (e.g., cylinder or box) could also help address the issue of freezing, as an example. Alternatively, in much warmer climates, where the water wire could be subject to overheating, providing a greater number of tubes and/or supercapacitors could help evenly dissipate the overall heat generated. Furthermore, the thickness of the wire itself may be varied to adjust the amount of power generated, and therefore the amount of heat generated. The following exemplary calculations will show how varying the thickness of the tube can help address overheating.

As an example, let an electric vehicle traveling at about 66 mph be retrofitted with a water wire, the water wire being 100 m long and having an inner diameter of 1.14 cm. The inner radius of the tube is therefore 0.57 cm. Also, let the tubing material be 1 cm thick (i.e., 1 cm between the inside diameter and the outside diameter). The inner area of a cross section of the tube can be calculated using:

$$Area_{inside} = \pi r^2 = \pi(0.57 \text{ cm})^2 = 1 \text{ cm}^2$$

The volume of the wire can then be found using:

$$Volume = A \times l = (1 \text{ cm}^2)(10{,}000 \text{ cm}) = 1 \times 10^4 \text{ cm}^3$$

The weight of water is approximately 1 gram (g) per cubic centimeter. Having calculated the volume of the water in the tube, the weight of the water in the tube is thus 10 kg. The weight of the water in kilograms can be converted to pounds by using the conversion 1 kg=2.20462 lbs. Thus, the weight of the water in pounds is $$\frac{10 \text{ kg}}{.45359 \text{ kg/lb}} = 22 \text{ lbs.}$$

Give that the length of the tube is 100 m, the voltage generated by the water wire can be calculated using:

$$V = B \times l \times v$$
$$V = (3 \times 10^{-5} T)(100 \text{ m})\left(\frac{29.5 \text{ m}}{s}\right)$$
$$V = 0.1 \text{ V}$$

The energy stored in a ten million Farad capacitor can then be calculated using:

$$E_{cap} = \frac{(1 \times 10^7 F)(0.1 \text{ V})(0.1 \text{ V})}{2} = 5 \times 10^4 \text{ J} = 50{,}000 \text{ J}$$

Let the amount of heat released by the tube be $h_t$, which is transferred from inside the tube to outside the tube. The amount of heat transferred can be calculated using:

$$h_t = \frac{a \times k \times (t_{hot} - t_{cold})}{d},$$

where a is the area outside of the tube, k is the thermal conductivity of the material (=0.5 W/m Kelvin (K) for water solution), $t_{hot}$ is the temperature inside the tube, $t_{cold}$ is the temperature outside the tube, and d is the thickness of the tube. The area of the outside of the tube can be calculated as follows. Given that the radius of the inside of the tube is known, the circumference of the inside of the tube can be calculated using:

$$Circumference_{inside} = 2 \times \pi \times r_{inside} = 2\pi(0.57 \text{ cm}) = 3.6 \text{ cm}$$

Similarly, knowing that the thickness of the tube is 1 cm, the radius extending to the outside of the tube is therefore 1.57 cm (1 cm+0.57 cm), and the circumference of the outside of the tube can be calculated using:

$$Circumference_{outside} = 2 \times \pi \times r_{outside} = 2\pi(1.57 \text{ cm}) = 9.89 \text{ cm}$$

Knowing the outside circumference, the outside area of the tube can be calculated using:

$$a = Circumference_{outside} \times l = 9.89 \text{ cm}(10{,}000 \text{ cm}) = 9.89 \times 10^4 \text{ cm}^2 = 9.89 \text{ m}^2$$

Referring back to the equation for $h_t$, let the outside temperature $t_{cold}$ be 30° C., as an example, and let the inside temperature $t_{hot}$ reach 80° C. The amount of heat energy transferred can now be calculated using:

$$h_t = \frac{a \times k \times (t_{hot} - t_{cold})}{d} = \frac{(9.89 \text{ m}^2)\left(\frac{0.5 \text{ W}}{m}K\right)(80° \text{ C.} - 30° \text{ C.})}{.01 \text{ m}} = 24{,}500 \text{ J/s}$$

Thus, the amount of energy removed from inside the water wire every second is 24,500 J, while the amount of energy generated by the water wire and supplied to the supercapacitor is 50,000 J. Thus, having two water wires having a heat transfer of 24,500 J/s each may substantially maintain the temperature within the tube at 80° C., since about 50,000 J of energy are supplied to the supercapacitor and about 49,000 J of heat energy are therefore removed from the tube every second.

Now, having shown through the above calculations how to determine the heat transfer, a desired tube temperature can be calculated for a desired heat transfer. As an example, let the supercapacitor store 5,000 J, and let the desired heat transfer be 5,000 J/s, such that a temperature equilibrium is reached within the tube. The temperature inside the tube $t_{hot}$ can then be calculated using:

$$5{,}000 \text{ J/s} = \frac{(9.89 \text{ m}^2)\left(\frac{0.5 \text{ W}}{m}K\right)(t_{hot} - 30° \text{ C.})}{.01 \text{ m}}$$

$$t_{hot} = 40.2° \text{ C.}$$

Thus, the temperature within the tube will reach equilibrium at about 40.2° C. At this temperature, every second 5,000 J of heat energy is generated within the tube to charge the supercapacitor, and 5,000 J of heat energy is also released out of the tube. An advantage of constructing the tubing out of high-density polyethylene is that heat may only flow out of the tube, rather than also be absorbed into the tube. The temperature inside the tube will remain constant at about this temperature and given that water boils at 100° C., 42° C.

may be an acceptable heat level. As demonstrated by the above calculations, choosing a particular thickness of the wire, d, causes the amount of heat energy released from inside the tube to change. Due to the inversely proportional relationship between the tube thickness and the heat transfer energy, increasing the thickness d decreases the heat transfer $h_r$. Thus, an advantage is that the temperature within the water wire can be regulated by varying the thickness of the tubing.

Figure 9A:
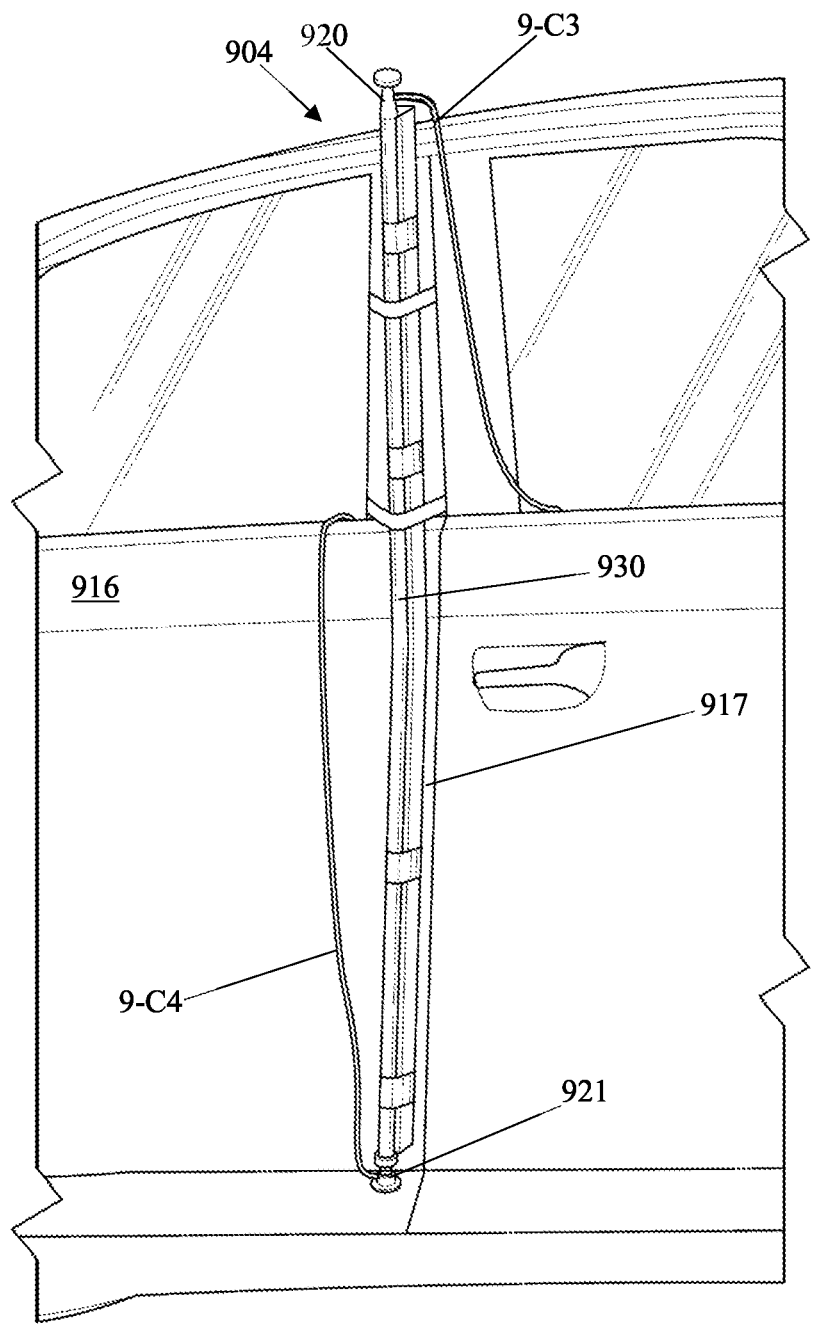
FIGS. 9A-9C illustrate an example of the water wire 804 of FIG. 8 used in an exemplary experiment, according to an aspect.
Figure 9B:
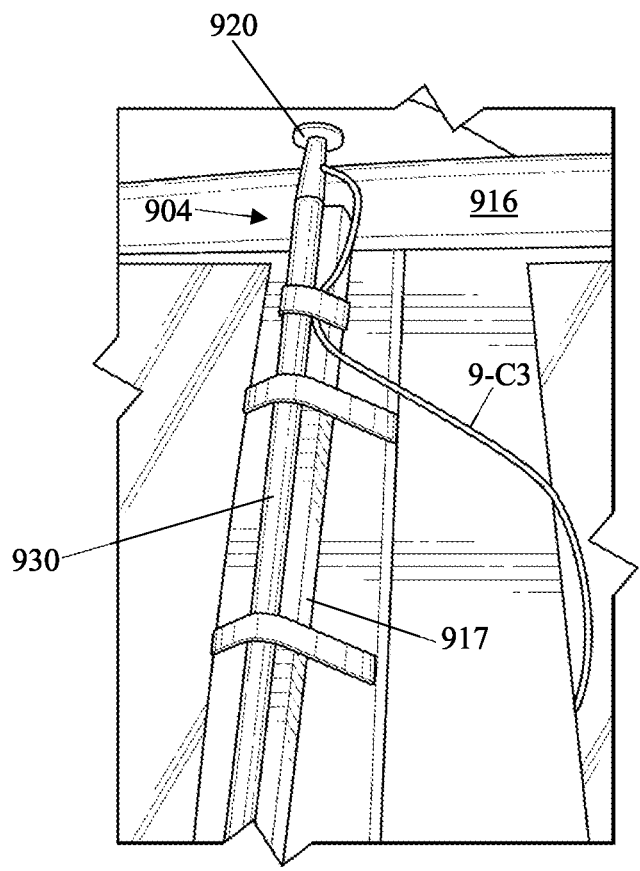
Figure 9C:
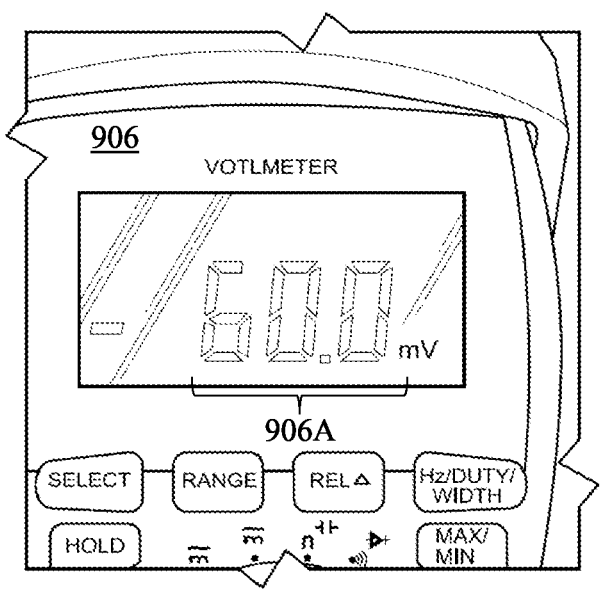

FIGS. 9A-9C illustrate an example of the water wire 804 of FIG. 8 used in an exemplary experiment, according to an aspect. What follows is a succinct presentation of the experiments conducted to arrive at the systems and methods disclosed above. A vehicle 916 was used to carry the water wire 904 connected to a voltmeter 906 via electrodes 920, 921 by wire leads 9-C3 and 9-C4. The water wire 904 was attached to the vehicle by a wooden piece 917, which does not impede the Earth's magnetic field and provided insulation for the wire 904, protecting it from any interference from the vehicle. The experiment was performed on a small scale, driving the vehicle with only one water wire 904 and taking readings from the voltmeter 906 inside the vehicle 916. The experiment showed that a voltage was collected by the water wire 904. The collected voltage appeared to be sufficient to provide supplemental energy to an electric vehicle as disclosed above, particularly if the number of water wires and/or length of said wires were to be increased.

It should be understood that retrofitting a vehicle with the systems described herein and exemplarily shown in FIGS. 9A-9C may be performed in any manner deemed suitable, such as, for example, including a system attached via a trailer hitch to the vehicle, using a bicycle rack or other such similar devices to carry the system, or attaching the system onto the roof, doors (as shown), undercarriage, or interior of the vehicle using any suitable method. An electric vehicle may also be constructed with the system already built in, or the body of an electric vehicle may for example be constructed with other similar suitable technology such as, for example, the water wires forming integral portions of the vehicle body. Thus, an advantage is the ability of the water wires to be easily adapted and integrated into existing vehicles, systems, and other apparatuses.

Figure 10:
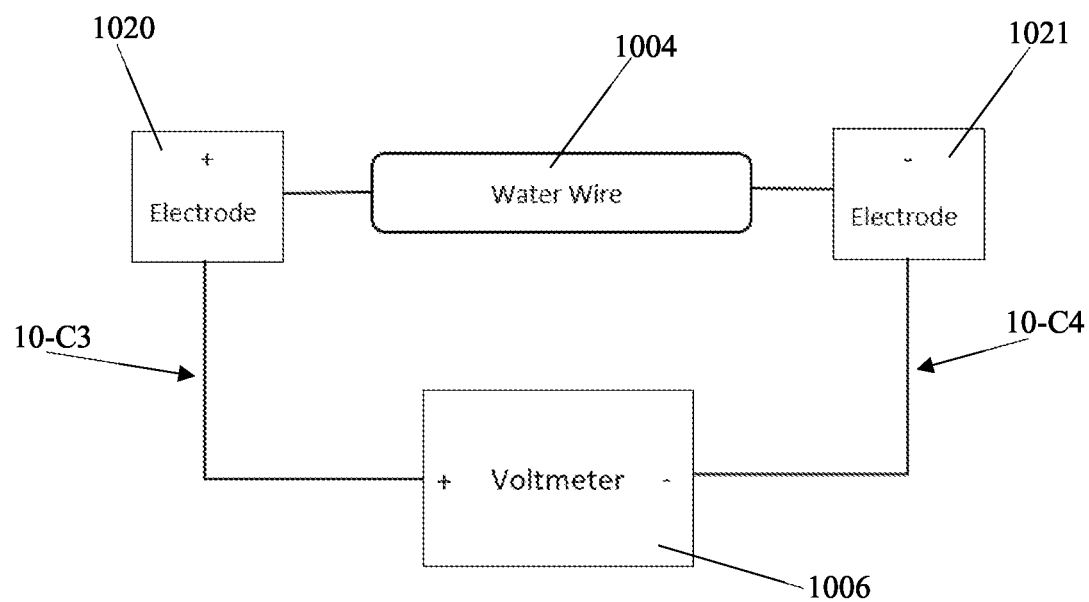
FIG. 10 is a block diagram representation of the exemplary experimental setup shown in FIG. 9, according to an aspect.

FIG. 10 is a block diagram representation of the exemplary experimental setup shown in FIG. 9, according to an aspect. In the experiment shown and represented in FIGS. 9A-10, the water wire 1004 was configured with a 0.914 m plexiglass tubing and filled with a 20% solution of sodium chloride (by mass) dissolved in water. As shown, each end of the water wire was adapted with an electrode 1020, 1021, which were electrically connected to a voltmeter 1006 via wires 10-C3 and 10-C4. The water wire attached to the vehicle 916, which was driven from a start to 60 mph in an East-West direction, which is perpendicular to the Earth's magnetic field lines of force. The voltmeter 1006 was zeroed at the start of the experiment. As the vehicle was driven, energy was generated within the water wire 1004, which was captured by the voltage reading of the voltmeter 1006. As shown as an example in FIG. 9C, at 60 mph the voltmeter 906 read 60 mV (shown at 906A). In this way, the water wire continuously generated about 8.4 mV, showcasing the water wire's ability to generate voltage to power a supercapacitor and retain continuous charge.

It should be understood that although the tubing of the water wire is depicted as being straight/linear in FIGS. 9A-9B, the water wire may be provided with flexible tubing (like a hose, for example), such that the water wire may be coiled or slightly folded (e.g., as shown in FIG. 7b) such that to fit the water wire within a cylindrical or rectangular case mounted on or within an electric vehicle (or other machine), such that at any given time while the vehicle is in motion, at least a portion of the water wire may be perpendicular to the Earth's magnetic field lines of flux. It should also be understood that although the water wire shown in FIGS. 9A-9B was provided with a 20% sodium chloride solution, a greater or lesser percent mass of sodium chloride may be provided with the water solution to provide the water wire with a greater or lesser conductivity and/or resistance (as needed). It should also be understood that the various calculations presented throughout this disclosure are presented as exemplary applications of the disclosed energy generation system and are not intended to limit the present invention to any embodiments presented via the calculations. It should also be understood that the electrical pins may be constructed of any suitable material to allow the pins to be conductive, such as for example silver, copper, and/or gold.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, the term "motor" refers to any machine, such as an engine, that converts one form of energy into mechanical energy. Thus, the "motor" is any machine that supplies motive power for an electrical device having moving parts. The term "electrode" refers to a solid electric conductor that carries electric current and is used to contact a nonmetallic part of a circuit (e.g., nonmetallic solids, or liquids, or gases, or plasmas, etc.).

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A system for using the Earth's magnetic field to provide supplemental power to a machine having a motor, the system comprising:
a computer;
at least one energy storing device; and
at least one water wire adapted to be attached to the machine and electrically connected to the at least one energy storing device, such that at least a portion of the least one water wire is orthogonal to the Earth's magnetic field lines of flux during a motion of the machine;
the computer being in electrical communication with the at least one water wire and the at least one energy storing device;
the at least one water wire comprising:
a sealed tube having a length and an inner diameter;
a pair of conductive pins attached at opposite ends of the sealed tube; and
a water solution having a conductive solute, the water solution being provided
within the sealed tube such that to contact the pair of conductive pins;
wherein, when the machine is put in motion with the at least one water wire attached to the machine by a power source powering the motor, a voltage generates within the sealed tube, thus collecting electrical energy from the Earth's magnetic field;
wherein the collected electrical energy is stored in the at least one energy storing device; and
wherein the computer is adapted to direct the stored electrical energy to the motor or other machine components, such that to provide the machine with the supplemental power.

2. The system of claim 1, wherein the machine is one of an electric car, a satellite, aircraft, and a space station.

3. The system of claim 1, wherein the power source is a battery.

4. The system of claim 1, wherein the at least one energy storing device is a supercapacitor.

5. The system of claim 1, wherein the conductive solute causes the at least one water wire to have resistance.

6. The system of claim 1, wherein the conductive solute is sodium chloride.

7. The system of claim 1, wherein the sealed tube is constructed of high-density polyethylene, the sealed tube also having a thickness.

8. The system of claim 1, wherein the at least one water wire is integral to the body of the machine.

9. A system for using the Earth's magnetic field to provide supplemental power to a machine having a motor, the system comprising:
a computer;
at least one water wire; and
at least one energy storing device;
the computer being in electrical communication with the at least one water wire and the at least one energy storing device;
the at least one water wire comprising;
a sealed tube having a length and inner diameter;
a pair of conductive pins attached at opposite ends of the sealed tube; and
a water solution having a conductive solute, the water solution being provided within the sealed tube such that to contact the pair of conductive pins;
wherein the at least one water can collect electrical energy from the Earth's magnetic field when the machine is put in motion by a power source powering the motor; and
wherein the collected electrical energy is stored in the at one energy storing device or used to provide the supplemental power to machine or other machine components.

10. The system of claim 9, wherein the machine is one of an electric car, a satellite, an aircraft, and a space station.

11. The system of claim 9, wherein the power source is battery.

12. The system of claim 9, wherein the at least one energy storing device is a supercapacitor.

13. The system of claim 9, wherein the conductive solute causes the at least one water wire to have a resistance.

14. The system of claim 9, wherein the conductive solute is sodium chloride.

15. The system of claim 9, wherein the sealed tube is constructed of high density polyethylene, the sealed tube also having a thickness.

16. The system of claim 9, wherein the at least one water wire is integral to the body of the machine.

17. A system for collecting electrical energy from the Earth's magnetic field to provide power to a machine, the system comprising a water wire adapted to be associated with the machine, the water wire comprising:
a sealed tube having:
a length and an inner diameter; and
a thickness;
a pair of conductive pins attached to opposite ends of the sealed tube; and
a water solution having dissolved sodium chloride, the water solution being provided within the sealed tube such that to contact the pair of conductive pins;
wherein, when the water wire is put in motion through the Earth's magnetic field by the machine, a voltage generates within the sealed tube, thus collecting electrical energy from the Earth's magnetic field; and
wherein the conductive pins are adapted to transfer the collected electrical energy to the machine.

18. The system of claim 17, further comprising an energy storing device adapted to receive the collected electrical energy, such that the collected electrical energy can be stored in the energy storing device.

19. The system of claim 17, wherein the sealed tube is constructed of high density polyethylene.

20. The system claim 17, wherein the machine is one of an electric car, a satellite, an aircraft, and a space station.

* * * * *